United States Patent
Arndt et al.

(10) Patent No.: US 6,650,280 B2
(45) Date of Patent: Nov. 18, 2003

(54) MEASUREMENT SYSTEM AND METHOD

(75) Inventors: G. Dickey Arndt, Friendswood, TX (US); Phong H. Ngo, Friendswood, TX (US); James R. Carl, Houston, TX (US); Kent A. Byerly, Seabrook, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/953,612

(22) Filed: Sep. 14, 2001

(65) Prior Publication Data

US 2002/0101373 A1 Aug. 1, 2002

Related U.S. Application Data

(60) Provisional application No. 60/254,642, filed on Dec. 8, 2000.

(51) Int. Cl.$^7$ .................. G01S 13/08; G01S 13/86; G01F 23/28; E21B 47/10
(52) U.S. Cl. .................. 342/124; 367/99; 73/290 V; 73/290 R; 73/152.29; 73/152.31; 73/152.32
(58) Field of Search ................ 342/124; 73/290 V, 73/290 R, 152.18, 152.19, 152.21, 152.29, 152.31, 152.32, 861.23; 166/250.03; 175/65, 207

(56) References Cited

U.S. PATENT DOCUMENTS

| | | | | |
|---|---|---|---|---|
| 3,949,605 A | * | 4/1976 | Stallworth et al. .......... 367/128 |
| 3,958,458 A | * | 5/1976 | Foreman et al. .......... 73/861.18 |
| 4,240,299 A | * | 12/1980 | Joy et al. .................. 73/861.23 |
| 4,268,828 A | | 5/1981 | Cribbs et al. .............. 343/5 W |
| 4,732,035 A | | 3/1988 | Lagergren et al. ........... 73/49.2 |
| 4,754,641 A | * | 7/1988 | Orban et al. ............. 73/152.21 |
| 4,847,623 A | | 7/1989 | Jean et al. .................. 342/124 |
| 4,991,124 A | | 2/1991 | Kline ........................ 364/558 |
| 5,063,776 A | * | 11/1991 | Zanker et al. ........... 73/152.31 |
| 5,198,989 A | | 3/1993 | Petroff ........................ 364/510 |
| 5,233,352 A | | 8/1993 | Cournane .................. 342/124 |
| 5,315,880 A | | 5/1994 | Bailey ..................... 73/861.25 |
| 5,432,415 A | * | 7/1995 | Ittah et al. .................. 318/483 |
| 5,811,688 A | | 9/1998 | Marsh et al. ............ 73/861.25 |
| 5,942,687 A | | 8/1999 | Simmonds et al. ........... 73/579 |
| 6,053,041 A | * | 4/2000 | Sinha ...................... 73/290 V |
| 6,078,280 A | | 6/2000 | Perdue et al. ............... 342/124 |
| 6,097,189 A | | 8/2000 | Arndt et al. ................ 324/326 |

FOREIGN PATENT DOCUMENTS

DE 19722180 A1 * 12/1998

* cited by examiner

Primary Examiner—Ian J. Lobo
(74) Attorney, Agent, or Firm—Theodore U. Ro

(57) ABSTRACT

System and methods are disclosed for fluid measurements which may be utilized to determine mass flow rates such as instantaneous mass flow of a fluid stream. In a preferred embodiment, the present invention may be utilized to compare an input mass flow to an output mass flow of a drilling fluid circulation stream. In one embodiment, a fluid flow rate is determined by utilizing a microwave detector in combination with an acoustic sensor. The acoustic signal is utilized to eliminate $2\pi$ phase ambiguities in a reflected microwave signal. In another embodiment, a fluid flow rate may be determined by detecting a phase shift of an acoustic signal across two different predetermined transmission paths. A fluid density may be determined by detecting a calibrated phase shift of an acoustic signal through the fluid. In another embodiment, a second acoustic signal may be transmitted through the fluid to define a particular $2\pi$ phase range which defines the phase shift. The present invention may comprise multiple transmitters/receivers operating at different frequencies to measure instantaneous fuel levels of cryogenic fuels within containers positioned in zero or near zero gravity environments. In one embodiment, a moveable flexible collar of transmitter/receivers may be utilized to determine inhomogenuities within solid rocket fuel tubes.

47 Claims, 12 Drawing Sheets

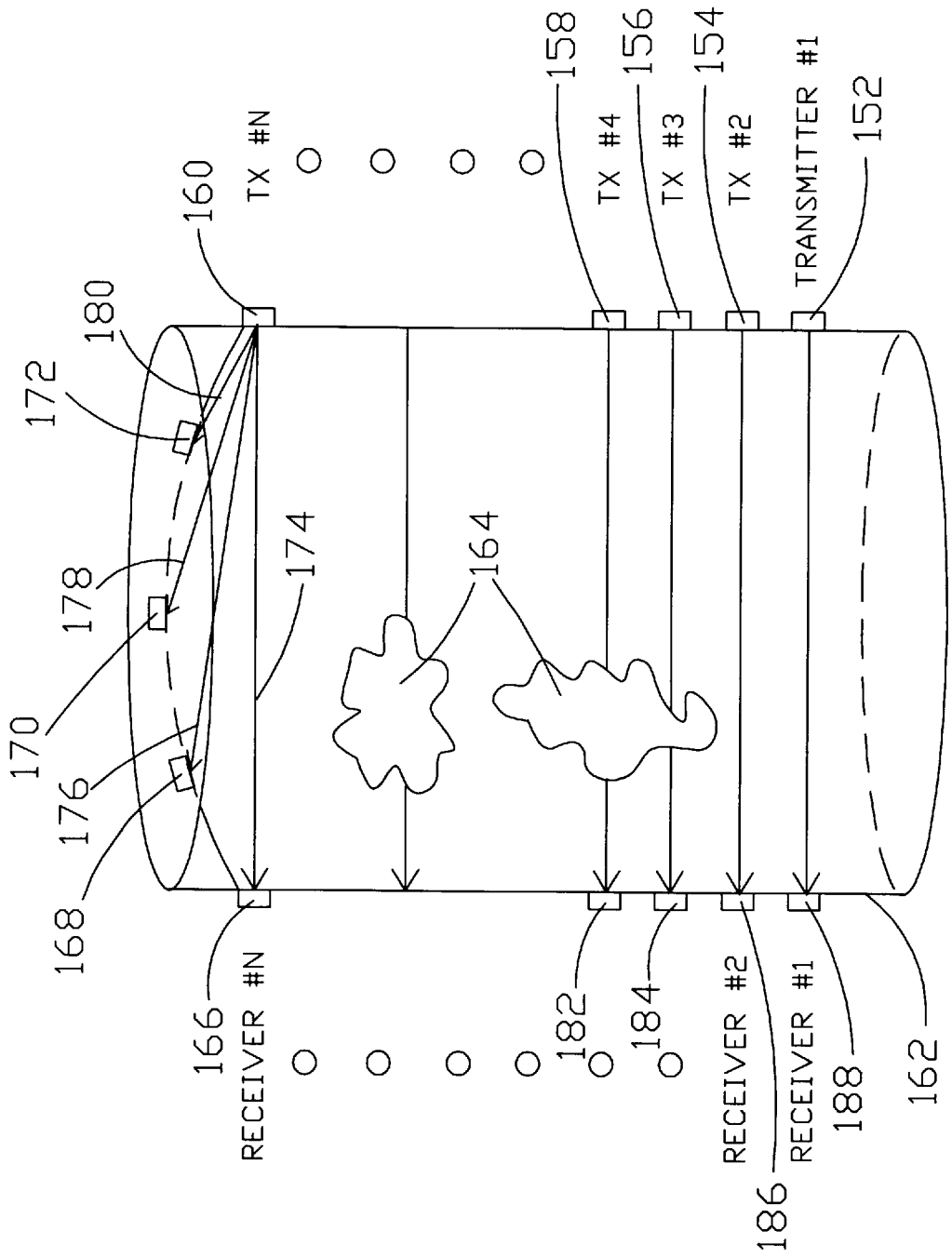

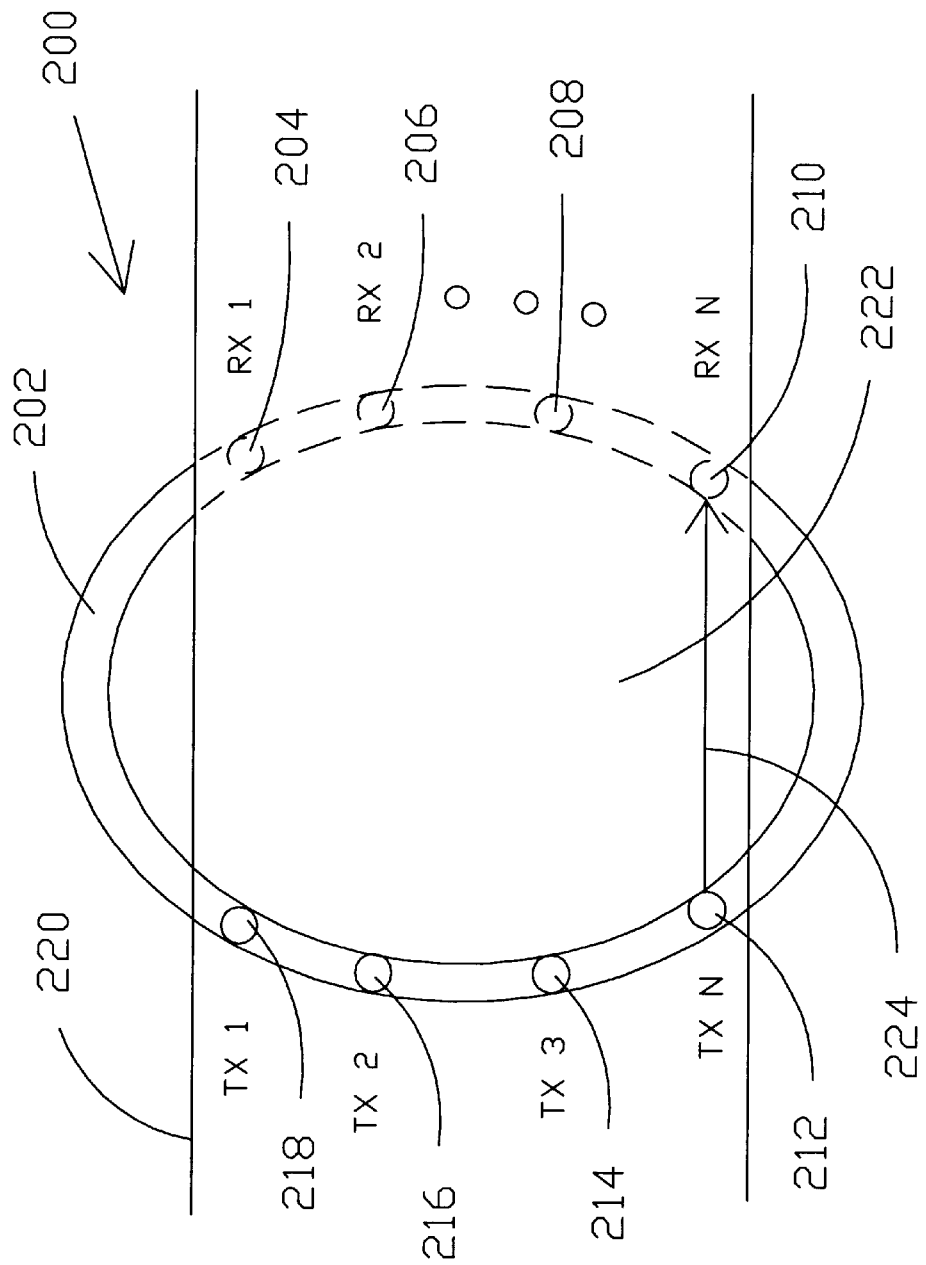

MEASUREMENT SYSTEM AND METHOD

This application claims the benefit of Provisional Applicational No. 60/254,642, filed Dec. 8, 2000.

The invention described herein was made in the performance of work under a NASA contract and is subject to Public Law 96-517 (35 U.S.C.§200 et seq.) The contractor has not elected to retain title to the invention.

BACKGROUND OF THE INVENTION

1. Field of the Invention

The present invention relates generally to fluid measurements and, more specifically, to a fluid measurement system that may be utilized for making mass measurements during fluid flow. The present invention also has application in reduced and zero gravity environments and for finding discontinuities in an otherwise homogeneous material.

2. Background of the Invention

It is well known that when drilling wells for hydrocarbons, a standard drilling practice involves circulating drilling fluid from the surface downwardly through the drilling string. The drilling fluid emerges at the drill bit and returns to the surface through the annulus in the wellbore on the outside of the drilling string. The drilling fluid performs many functions, some of which are discussed herein. The drilling fluid cools and reduces friction of rotating the drilling string. The drilling fluid removes excavated material from the wellbore in the circulation stream flowing to the surface. The drilling fluid is preferably weighted so that a downhole hydrostatic force is created adjacent to hydrocarbon bearing formations, which is greater than the internal pressure within the hydrocarbon bearing if formations. Thus, by adjusting the weight of the drilling fluid with suitable weighting material, blowouts are prevented during the drilling process.

However, due to various conditions downhole, problems may occur with the circulation. For instance, drilling may occur into a lost circulation zone whereby the lost circulation zone, such as a downhole cavern, absorbs a portion of the drilling fluid, thereby reducing the hydrostatic pressure and increasing the potential for a blowout. As another example, drilling may occur into an unanticipated high pressure zone whereby gas bubbles begin to push the drilling fluid out of the wellbore at a higher rate than fluid is pumped into the wellbore thereby reducing the hydrostatic pressure and increasing the potential for a blowout. Surface blowout preventors can be activated to prevent blowouts, but it is highly desirable to have some early warning of impending circulation problems so that suitable pressure control steps can be taken before a blowout actually occurs. It would also be desirable to monitor the drilling fluid density and/or flow rates and/or instantaneous mass in real time with very high accuracy for use in adjusting drilling weights, evaluating formation cuttings, determining changes in drilling such as entry into new formation layers, evaluating drill bit performance in terms of excavated material, and the like, as well as providing early warnings of impending circulation problems.

The following patents listed herein disclose various attempts by previous inventors to solve problems which may be related to the above:

U.S. Pat. No. 4,268,282, issued May 19, 1981, to Cribbs et al., discloses a microwave radar system which employs heterodyned swept frequency at approximately two millisecond sweep intervals. The power source is a reliable solid state, low power device such as a Gunn diode. The heterodyned difference frequency signals are converted to digital form, transformed into the frequency domain by means of a Fourier power transform, and then averaged by computer processing. Performing the Fourier power transform before averaging enables the processing of quasi-incoherent data whereby signal-to-noise ratio improvement is a function of the square root of the average number of samples taken. High-speed processing is used to offset the loss of statistical averaging of phase-coherent data which cannot be preserved because of target motion. Thus, the sequence of the power transform allows phase-less averaging over the entire collection period. Complementary elements including signal isolation and stability, through interdependent design features of the antenna and circulator, permit the use of low-power CW radar which minimizes danger to ecology and human safety. Thus, the invention has particular applicability to the analysis of clouds, the extraction of range and thickness data of clouds, and the presence and velocity of rainfall. The invention can be used for point targets as well. Algorithms are built into the computer to compensate for various factors such as wind, temperature, and the nature of scattering nuclei.

U.S. Pat. No. 4,732,035, issued Mar. 22, 1988, to Lagergren et al., discloses a method and apparatus for substantially eliminating measuring inaccuracies in a storage tank leak detection system caused by temperature-induced volumetric changes in the stored fluid product. In a preferred embodiment of the method, a limp bladder is connected to an end of a pressure tube having an inlet and a substantially hollow core. The pressure tube and the bladder are filled with a medium having a temperature coefficient substantially lower than the temperature coefficient of the fluid product. The pressure tube and the bladder are then supported in a substantially vertical manner in the storage tank such that a first portion of the medium is supported in the bladder in static equilibrium with respect to a second portion of the medium supported in the pressure tube. The large disparity between the temperature coefficients of the medium and the fluid product insures that temperature-induced volumetric changes in the fluid product do not vary the level of the medium in the pressure tube. Accordingly, variations in the medium level in the tube represent a true indication of leakage of the fluid product out of the storage tank or leakage of a foreign product into the storage tank.

U.S. Pat. No. 4,847,623, issued Jul. 11, 1989, to Jean et al., discloses a sweep frequency, continuous wave radar tank gauge providing measurement of the level of tank contents or ullage, having greatly improved accuracy through improved methods of processing calibrate and return signals directed toward the surface of tank contents. Use of sweep synchronous measurement of time domain calibrate/return difference signals and time domain of a virtual "carrier" fundamental in the frequency domain, provide highly accurate measure of tank signal return times. The entire range of return signals is made available for processing and analysis, including distinguishable tank bottom reflections.

U.S. Pat. No. 4,991,124, issued Feb. 5, 1991, to Bruce R. Kline, discloses a method and system that determines the density of a liquid, such as aircraft fuel, by measuring the amplitude of the reflections of ultrasonic pulses from the faces of the walls of a reference material. A transducer is used to transmit an ultrasonic interrogation pulse through a liquid to the reference material. The density of the reference material is known, and its boundaries are well defined. The interrogation pulse is reflected from the faces of the reference material boundaries to provide first, second and third return pulses that can be used to determine the density of the liquid. The density determination is accomplished by determining characteristic impedances, reflection coefficients and transmission coefficients as a function of the returned pulse amplitudes.

U.S. Pat. No. 5,198,989, issued Mar. 30, 1993, to Alan M. Petroff, discloses a sewer flow monitoring system wherein the volume of flow is determined from the depth of fluid in a pipe together with the average velocity of flow through the pipe as determined by detecting the peak velocity from particles flowing in sewage at different velocities and then determining average velocity to be approximately 90% of the peak velocity.

U.S. Pat. No. 5,233,352, issued Aug. 3, 1993, to Thomas C. Cournane, discloses a generation of a first and second identical pseudo-random binary sequences. The second sequence is delayed in a variable delay arrangement, and a reflected first sequence is compared with a delayed second sequence. The second sequence is delayed until the reflected sequence and the delayed sequence are coincident. The delay of the adjustable delay is equal to the travel time of the first sequence.

U.S. Pat. No. 5,315,880, issued May 31, 1994, to Michael R. Bailey, discloses a non-invasive method for measuring the velocity of a fluid surface flowing in a predetermined direction in a channel or flume includes the steps of generating a microwave frequency electrical signal adapted to reflect from the fluid surface; spacing the generation of the electrical signal from the fluid surface; directing the signal along a line toward the fluid surface and opposite the predetermined direction and at an angle of between 30 degrees and 40 degrees to the fluid surface; detecting the signal reflected from the fluid surface; and determining from the directed and reflected signal the Doppler frequency shift therebetween as a measure of the velocity of the fluid surface.

U.S. Pat. No. 5,811,688, issued Sep. 22, 1998, to Marsh et al., discloses a flowmeter utilizing velocity at the surface of a fluid and lookdown level sensors is mounted within a manhole without requiring entry into the manhole by the installer. The velocity and level sensors generate first and second energy signal beams which are directed toward the same vicinity of the fluid surface which reflects the beams back to the sensors surface velocity signal representative of the velocity of scatters on the fluid surface is produced from the Doppler frequency shift between the directed and reflected first beam. This signal is modified to produce a mean velocity signal. A level signal is produced by determining the air space between the sensor and the fluid surface from the directed and reflected second beam and relating changes in the air space to changes in fluid level in accordance with the configuration of the pipe. Fluid flow can be calculated from the mean velocity and fluid level signals.

U.S. Pat. No. 5,942,687, issued Aug. 24, 1999, to Simmonds et al., discloses an aspect of the present invention is an apparatus for inspecting a base of liquid filled tank for corrosion, having (a) a housing for use in the liquid filled tank; (b) a set of one or more ultrasonic transducers mounted to the housing, for directing one or more ultrasonic pulses at the base, where the ultrasonic pulses each have a frequency selected to produce a return signal from the base, and for receiving this return signal; and (c) a data capturing system, for storing information from these return signals. Optional features include a second set of one or more ultrasonic transducers for directing one or more ultrasonic pulses at the liquid/gas interface at a frequency selected to produce a return signal from the liquid/gas interface, a data analysis system, a locomotive system, and a spatial location system. Another aspect of the invention is a method for inspecting a base of a liquid filled tank for corrosion, having the steps: (a) directing a broadband ultrasonic pulse at the base from an ultrasonic transducer within the tank, where the ultrasonic pulse includes a resonant frequency for the tank base over the range of expected thicknesses for the base; (b) receiving a return signal with the ultrasonic transducer; (c) performing a Fourier analysis on the return signal to generate a frequency domain signal; and (d) determining the thickness of the base from the frequency domain signal.

U.S. Pa. No. 6,078,280, issued Jun. 6, 2000, to Perdue et al., discloses a method and apparatus for processing a time domain reflectometry (TDR) signal having a plurality of reflection pulses to generate a valid output result corresponding to a process variable for a material in a vessel. The method includes the steps of determining an initial reference signal along a probe, storing the initial reference signal as an active reference signal, periodically detecting a TDR signal along the probe in the vessel, and computing the output result using the TDR signal and the active reference signal. The method also includes the steps of determining an appropriate time for updating the active reference signal, automatically computing an updated reference signal at the appropriate time, and overwriting the active reference signal with the updated reference signal for use in subsequent computations of the output result.

U.S. Pat. No. 6,097,189, issued Aug. 1, 2000, to Arndt et al., discloses a portable system that is operational for determining, with three dimensional resolution, the position of a buried object or a proximately positioned object that may move in space or air or gas. The system has a plurality of receivers for detecting the signal from a target antenna and measuring the phase thereof with respect to a reference signal. The relative permittivity and conductivity of the medium in which the object is located is used along with the measured phase signal to determine a distance between the object and each of the plurality of receivers. Knowing these distances, an iteration technique is provided for solving equations simultaneously to provide position coordinates. The system may also be used for tracking movement of an object within close range of the system by sampling and recording subsequent positions of the object. A dipole target antenna, when positioned adjacent to a buried object, may be energized using a separate transmitter which couples energy to the target antenna through the medium. The target antenna then preferably resonates at a different frequency, such as a second harmonic of the transmitter frequency.

The above prior art does not disclose a system that provides a highly accurate instantaneous mass determination that may be used for comparing circulation input to the wellbore with the circulation output from the wellbore. Moreover, the prior art does not disclose an inexpensive system for determining densities, volumes, and other measurements of materials such as fluid and water at different positions within a container. Therefore, those skilled in the art have long sought and will appreciate the present invention that addresses these and other problems.

SUMMARY OF THE INVENTION

An object of the present invention is to provide an improved fluid measurement system and method.

Another object of the present invention is to provide a highly accurate real time monitor of fluid flow instantaneous mass.

Yet another object of the present invention is to provide a means for measuring the amount (volume) of cryogenic fluids (liquid nitrogen, oxygen, and hydrogen) stored in fuel tanks in zero or reduced gravity environments.

Yet still another object of the present invention is to detect the presence of lumps, variations, and/or other inhomogeneities in materials such as the solid rocket booster (SRB) propellants used in NASA spacecraft.

One of many advantages of the present invention is a highly accurate density measurement.

One of many features of a preferred embodiment of the present invention are novel techniques for accurately measuring total and/or partial fluid flow rates.

Another of many features of a preferred embodiment of the present invention is a system and method to determine fluid density from acoustic phase shift with high accuracy.

An advantage of the present invention is a real time system that permits evaluation of fluid flow for early warning of circulation problems when used in drilling operations.

These and other objects, features, and advantages of the present invention will become apparent from the drawings, the descriptions given herein, and the appended claims. It will be understood that above-listed objects, features, and advantages of the invention are intended only as an aid in quickly understanding aspects of the invention, are not intended to limit the invention or invention definition in any way, and do not form a comprehensive list of such objects, features, and advantages.

Therefore, one embodiment of the present invention comprises a fluid measurement system for a fluid comprising one or more system elements such as, for instance, a detector section defining a fluid channel for receiving the fluid, a sonic detector mounted to the detector section with respect to the fluid channel for transmitting an acoustic signal towards a fluid surface of the fluid within the fluid channel and for receiving an acoustic signal reflection from the fluid surface, and a microwave detector mounted to the detector section with respect to the fluid channel so as to be operable for transmitting a microwave signal towards the fluid surface and receiving a microwave signal reflection from the fluid surface. Thus, the inventive configuration very accurately determines the height of the fluids within the detector section on an instantaneous basis.

Other elements of the system may comprise an instrument section operable for determining a first approximate fluid level of the fluid surface with respect to the fluid channel from the acoustic signal reflection and for determining a second more accurate fluid level of the fluid surface from the first approximate fluid level and the microwave signal reflection. The instrument section may be operable for determining a fluid flow rate of the fluid through the channel from a fluid level of the fluid surface within the fluid channel. In one preferred embodiment, the instrument section is operable for determining the fluid flow rate solely from the fluid level within the fluid channel. In another embodiment, the instrument section detects a phase difference between the transmitted acoustic signal and the received acoustic signal, and the instrument section is operable for determining a fluid density of the fluid from the phase difference.

The system may further comprise a plurality of acoustic sensors mounted to the detector section in communication with the fluid channel. A transmitter acoustic sensor may be provided for producing a transmitted acoustic signal and a receiver acoustic sensor for receiving a received acoustic signal. This configuration can also determine the fluid density at different layers (heights) within the fluid. Multiple transmitter/receiver pairs, each operating at slightly different frequencies may be used to measure the fluid density at different heights through the fluid.

Another embodiment of the invention may comprise a detector section defining a fluid channel for receiving the fluid, at least one acoustic signal transmitter mounted to the detector section in communication with the fluid channel for transmitting an acoustic signal through the fluid, at least one acoustic signal receiver mounted to the detector section in communication with the fluid channel operable for receiving the acoustic signal from the acoustic signal transmitter, and at least one instrument section for determining a density of the fluid from a phase change of the acoustic signal between the acoustic signal transmitter and acoustic signal receiver.

The detector section may define a predetermined physical spacing between the acoustic signal transmitter and the acoustic signal receiver. In one embodiment, the acoustic signal transmitter has an acoustic signal transmission frequency such that a particular $2\pi$ phase range of the acoustic signal received by the acoustic signal receiver is predetermined. The acoustic signal transmission frequency may be selected such that a maximum phase change for all anticipated densities of the fluid is as close as possible to 360° but is preferably at least in the range of from 270° to 360° to provide for maximum phase sensitivity. Moreover, a frequency adjustment for the acoustic signal transmitter may be provided for selecting an acoustic signal transmission frequency based on a predetermined spacing between the at least one acoustic signal transmitter and the at least one acoustic signal receiver whereby the $2\pi$ E phase range of the acoustic signal received by the acoustic signal receiver is predetermined.

In another embodiment or variation of the above embodiment, a second acoustic signal transmitter may be mounted to the detector section in communication with the fluid channel for transmitting a second acoustic signal through the fluid such that the second acoustic signal transmitter has a different signal transmission frequency. In this case, the instrument section is operable for determining a particular $2\pi$ phase range of the acoustic signal utilizing the second acoustic signal.

In operation, a method in accord with the invention comprises one or more steps such as, for instance, transmitting an acoustic signal a predetermined distance through a fluid, receiving the acoustic signal, determining a phase difference of the acoustic signal across the predetermined distance, and determining a density of the fluid from the phase difference.

Preferably, the method comprises determining a $2\pi$ range (one complete cycle) of the phase difference of the acoustic signal. One method for determining $2\pi$ range of the phase difference of the acoustic signal further comprises selecting an acoustic signal transmission frequency based on the predetermined distance such that a $2\pi$ a range is predetermined for an anticipated range of densities of the fluid and/or selecting the acoustic signal transmission frequency and a maximum phase difference of the acoustic signal is preferably less than 360° for an anticipated range of densities of the fluid. In another method, the step of determining the $2\pi$ range further comprises transmitting a second acoustic signal at a second frequency, and utilizing the second acoustic signal for determining the $2\pi$ range of the phase difference of the acoustic signal. Using more than one acoustic signal frequency allows for the $2\pi$ phase ambiguities to be resolved over a predetermined density variation.

Another method of the present invention comprises one or more steps such as, for instance, transmitting a microwave signal towards a surface of a fluid to produce a reflected microwave signal, transmitting an acoustic signal towards the surface of the fluid to produce a reflected acoustic signal, and utilizing the reflected microwave signal and the reflected acoustic signal for determining a fluid level of the fluid. Other steps may comprise determining a density of the fluid, and utilizing the density and the fluid level to determine a mass flow rate of the fluid. The step of transmitting the microwave signal may further comprise transmitting a microwave signal that is stepped over a plurality of frequencies and/or processing the reflected microwave signal wherein the processing comprises taking a transform to produce a series of impulse functions.

Higher frequencies with shorter wavelengths allow greater phase resolution and hence increased accuracy in making density measurement. However, there can be $2\pi$ phase ambiguities, i.e., the number of complete cycles of the transmit signal is unknown. By having additional signals at lower frequencies, and hence, longer wavelengths, allows the number of complete cycles of the signal to be determined. Hence, the $2\pi$ it phase ambiguities have been resolved and no longer cause ambiguities in the data.

For the particular configuration where both an RF microwave signal and an acoustic signal are used to determine the fluid height within the detector section, the acoustic signal may be used to resolve $2\pi$ phase ambiguities (number of cycles) for the microwave signal. The measurement accuracy of the microwave signal is much greater than the measurement accuracy of the acoustic signal, but due to the short wavelength of the microwave signal, there can be many $2\pi$ phase ambiguities for the microwave signal. The acoustic signal is used to resolve these ambiguities.

In a preferred embodiment, a system is provided for measuring fluid mass flow of a drilling fluid circulation stream used while drilling a wellbore with a drilling string wherein the drilling circulation stream is pumped into the drilling string and returns to the surface through an annulus outside of the drilling string. The system may comprise one or more elements such as a sensor housing defining a fluid channel therein wherein the fluid channel is connected within the drilling fluid circulation stream for receiving the drilling fluid from the annulus. Other elements of the system may comprise a first fluid flow rate detector operable for determining a level of drilling fluid within the fluid channel and utilizing only the level for determining a first fluid flow rate through the fluid channel. A fluid density monitor may be mounted within the sensor housing operable for determining a first fluid density of the drilling fluid. At least one instrument section may be provided operable for determining a first fluid mass flow of the drilling fluid from the first fluid flow rate and the first fluid density. In this system, a second density sensor may be positioned along the drilling fluid circulation stream for determining a second fluid density of the drilling fluid in the drilling fluid circulation stream prior to entry into the drilling string, a second fluid flow rate detector positioned along the drilling fluid circulation stream for determining a second fluid flow rate of the drilling fluid in the drilling fluid circulation stream prior to entry into the drilling string, and the instrument section may be operable for determining a second fluid mass flow from the second density and the second fluid flow rate. In a preferred embodiment, the instrument section is then operable for comparing the first fluid mass flow to the second fluid mass flow.

The invention may further comprise another method for determining a velocity of the drilling fluid comprising steps such as receiving a first acoustic signal transmitted through the fluid along a first predetermined path, measuring a first phase change of the first acoustic signal due to a length of the first predetermined path, determining a density of the fluid, receiving a second acoustic signal transmitted through the fluid along a second predetermined path, measuring a second phase change of the second acoustic signal due to a length of the second predetermined path, and calculating the velocity of the fluid from the doppler shift. Secondary acoustic sensors can be installed either downstream, upstream, or both to measure positive and negative doppler shifts from which velocity may be extracted.

An alternate embodiment of the velocity measuring configuration may have additional acoustic transmitter/receiver modules at different heights within the fluid. Thus, the velocity flows for different strata of the fluid can be measured. It is possible that there will be different velocities of the flowing fluid. For instance, fluid flow may vary from slower moving, higher density rock fragments near the fluid stream bottom up to faster moving liquid flows toward the fluid surface. The system of the present invention can measure the velocities throughout the moving fluid.

Yet other embodiments of this measuring system may include multiple acoustic sensors matched to a near steady state flow of a fluid with software algorithms sensitized for detecting minor velocity perturbations riding atop the steady state flow. This configuration could be used to measure velocity perturbations in cryogenic fuel lines feeding liquid oxygen or hydrogen to a rocket engine.

Another embodiment may have multiple transmit/receive sensors mounted to the exterior side of cryogenic fuel tanks in a zero or near zero gravity environment. These sensors would measure the phase shift along paths between the sensors and hence the density or amount of fluid present between the sensors. It is well known that in zero gravity environments, cryogenic fluids tend to flow in globs inside the tanks, making it almost impossible to make measurements as to the amount of fuel remaining in the tank. By having multiple sensors operating at slightly different frequencies, a density profile of the flowing globs of fuel can be measured on an instantaneous basis. Thus, the amount of fuel in the tank can be calculated.

In yet another embodiment, the present invention may involve use of a flexible ring containing multiple transmit and receive acoustic sensors with each sensor pair operating at different frequencies to distinguish the different sensors. A space related application may involve passing this flexible ring along the exterior of long segments of solid rocket fuel propellants to ascertain any anomalies within the usually homogenous propellant tube. These anomalies or lumps in the propellant tube can cause non-uniform firing of the propellant. Any variations in the density of a material can be detected through the very accurate measurement of phase shifts of the acoustic signal as it propagates through the material.

BRIEF DESCRIPTION OF THE DRAWINGS

FIG. 11 is a diagrammatic view showing a configuration of sensors that may be utilized for measurement of the amount of liquid present within a tank for operation under conditions including even in zero or near zero gravity environments; and FIG. 12 is a diagrammatic view showing a preferably flexible ring configuration of sensors operable for measurements such as measurements of discontinuities and/or non-homogenuities in a solid rocket fuel tube.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DESCRIPTION OF PREFERRED EMBODIMENTS

In one presently preferred embodiment of the invention, a primary object of a mass measuring system is to measure the entrance and the exit masses of drilling fluid while drilling a well hole. After the input mass of the fluid is determined, the added or lost mass at the exit reveals the mass being generated or lost during drilling. This should provide early warning of trouble during the drilling process and possibly avoid the loss of a hole.

The present invention provides a sensing system that can provide accurate volume and density measurements of drilling fluid in one or more locations of the drilling fluid circulation stream as the drilling fluid is circulated into and out of the wellbore during drilling operations. To determine mass flow, the present invention preferably determines fluid velocity and density and then calculates instantaneous mass flow and/or mass flow over a selected time period. In one preferred embodiment of the invention, the entire fluid flow is measured. Alternatively, a small sample of the real-time fluid flow could be measured which may or may not accurately represent the total flow. Moreover, other embodiments of the invention also provide the option to measure the velocity of one or more individual layers of the fluid flow, and if desired, to determine total flow/mass/volume therefrom. Various embodiments and components of the present invention may be utilized individually for use related to the oil field equipment, downhole and surface logging of data, for industrial controls, and/or for other purposes. The input mass may typically be determined utilizing different sensors than the output mass, if desired. For instance, if the flow rate is already known such as from the mud pump strokes per minute rate, then a density measurement may be utilized in conjunction with that information to determine input mass.

Figure 1:
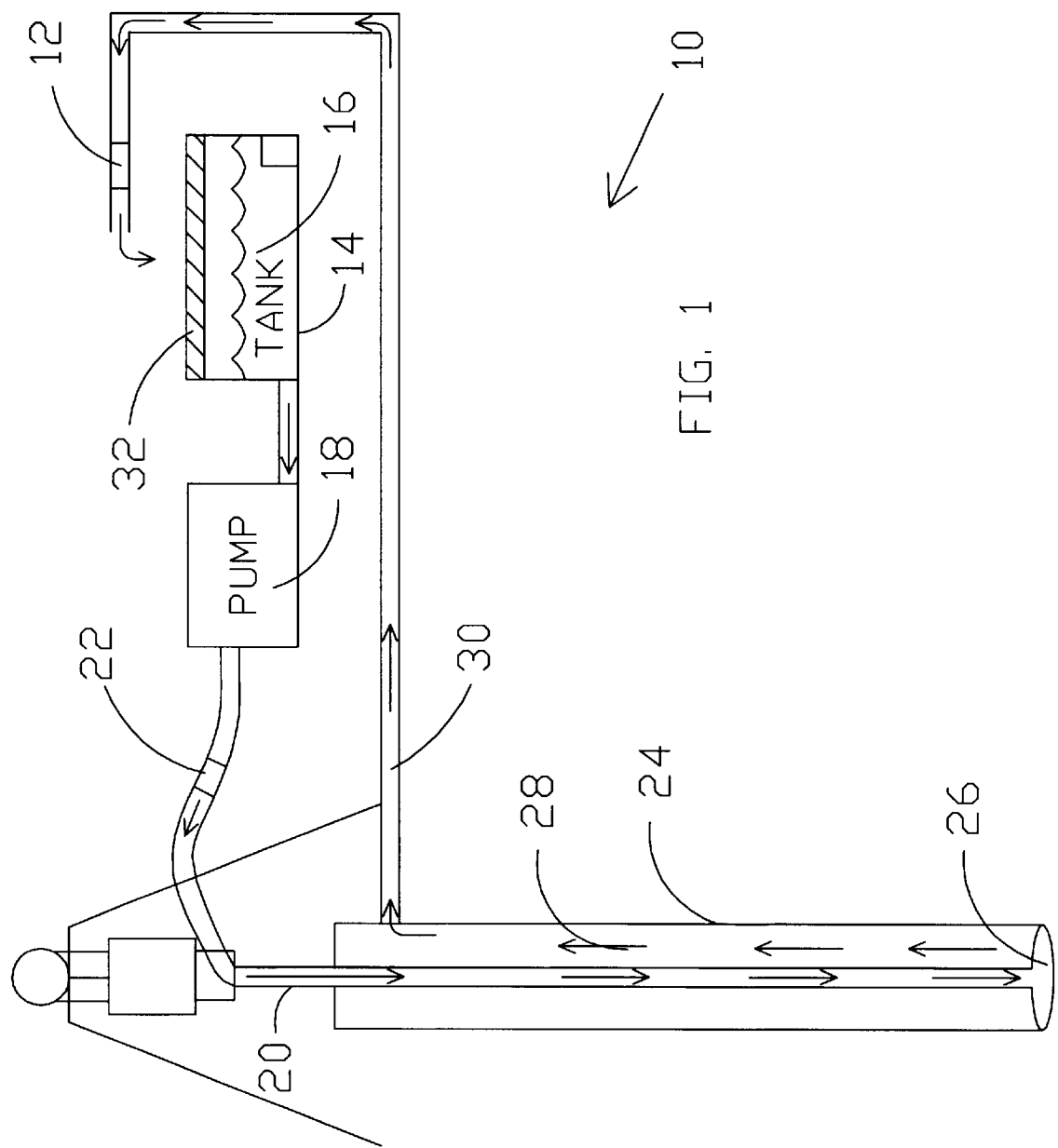
FIG. 1 is a schematic showing a simplified view of a circulation system for drilling a well in accord with the present invention.

Referring now to the drawings, and more particularly, to FIG. 1, there is shown a simplified drilling fluid circulation system 10 in accord with the present invention. Sensor 12 and/or other sensors may be utilized to measure the instantaneous mass and/or other attributes of the circulation stream as discussed below. Drilling fluid 16 may be stored in one or more interconnected tanks collectively represented as tank 14. The drilling fluid is pumped into drilling string 20 utilizing mud pump 18 in a manner well known to those of skill in the art. Generally, the rate of fluid flow is known from the number of strokes per minute of mud pump 18 as well as the volume of each stroke. The drilling fluid density may also be known at the output of mud pump 18. However, if desired, additional sensors in accord with the present invention such as fluid measurement sensor 22 may be utilized either before or after mud pump 18 to measure the rate of fluid flow and/or fluid density. The details of operation of sensors 12 and 22 are discussed subsequently.

The drilling fluid flows into pipe string 20 and through the interior of pipe string 20 to the bottom of wellbore 24 where the drilling fluid will typically emerge from drill bit 26. The drilling fluid then flows up annulus 28 on the outside of drilling string 20, as indicated by the arrows, to the surface where it flows from the surface well casing into return pipe 30. Typically, but not necessarily, return pipe 30 will be at a physical elevation above tank 14 so that drilling fluid flow is motivated by gravity at this point in the circulation stream. Drilling fluid then flows through sensor 12 and into tank 14. Vibrating screen 32, cyclonic filters (not shown), or other means may typically be utilized to filter various sized particles, such as drilling cuttings excavated by bit 26, from drilling fluid 16.

Figure 1B:
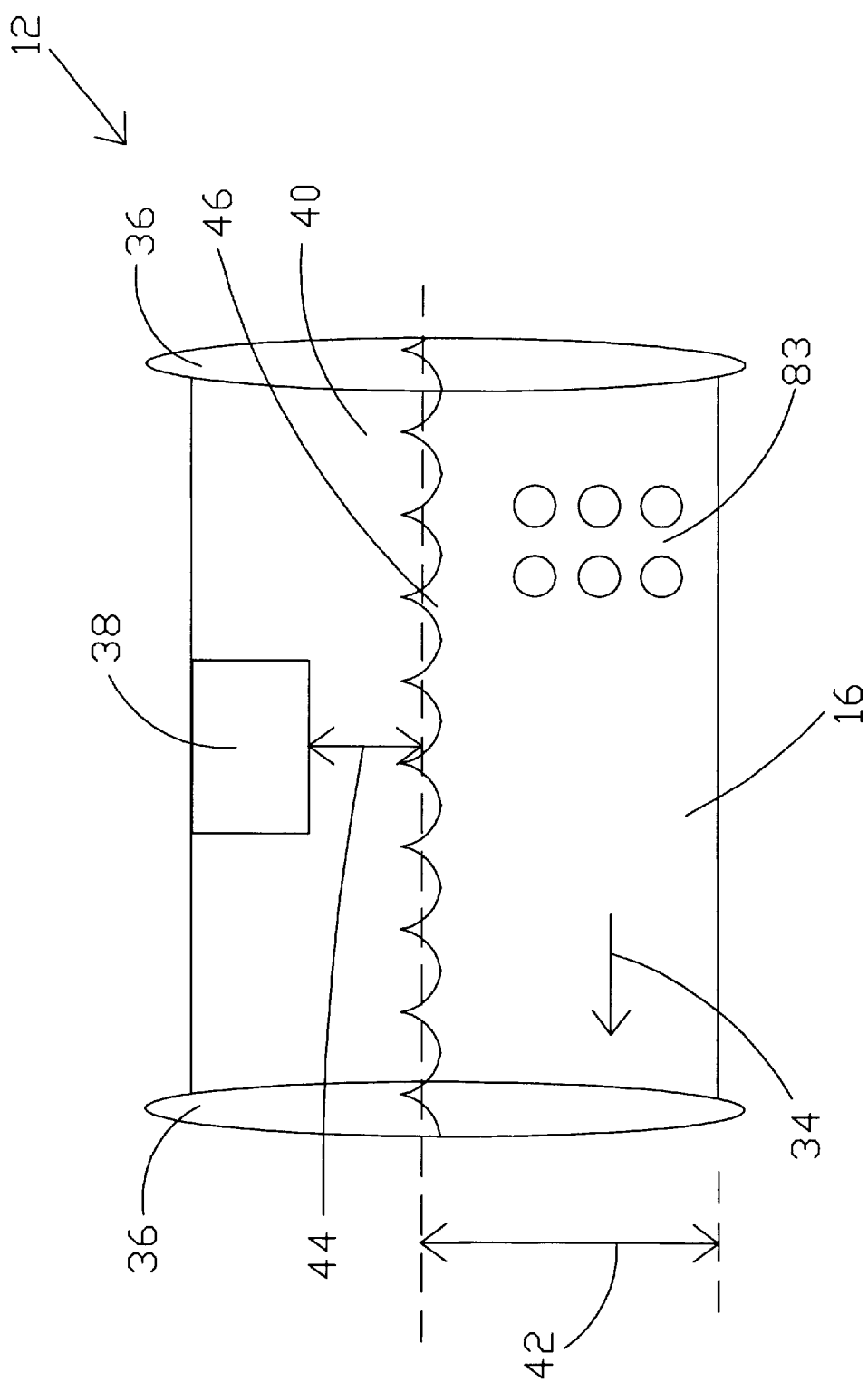
FIG. 1B is a schematic showing an enlargement of the circulation system of FIG. 1 which shows a sensor in accord with the present invention.

FIG. 1B shows an enlargement of physical features of sensor 12 which may, in a presently preferred embodiment, comprise a combination of detectors to provide a mass measurement during fluid flow of drilling fluid 16 as indicated by flow arrow 34. Sensor 12 may be connected by flanges or other suitable connectors 36 within circulation output flow line 30. Sensor 12 may or may not be open at the top depending on design and/or may include ventilation vents. As discussed subsequently, a preferred embodiment of the invention may utilize sensor 38 to measure a height or fluid level 42 within flow channel 40 of sensor 12. In a preferred embodiment, the height of fluid level 42 is used by itself as an indicator of total flow. The height may be determined in several ways such as by acoustic and/or microwave measurements. The presently preferred height measurement utilizes a combination of microwave measurements over a wide radio frequency (RF) bandwidth combined with a low (audio) frequency sensor to resolve two pi ($2\pi$) phase ambiguities in the microwave system. The microwave receiver may accurately determine the phase of a reflection but may not be able to determine the period with sufficient accuracy so that inaccuracies in the phase by multiples of $2\pi$ may occur. By providing a rough indication of distance with an acoustic signal, the appropriate $2\pi$ period of the microwave reflection signal can be determined during signal processing. Then the phase in that particular $2\pi$ period can be utilized for an increased accuracy of the distance or height determination. Therefore, the combination of microwave and acoustic signal transducers results in an accurate height or distance measurement. However, it will be understood that height may be determined by either an acoustic signal alone, two or more acoustic signals, a microwave signal, or the like. As well, velocity of the fluid flow may be determined in other ways as discussed hereinafter.

Flow channel 40 is typically selected to be large enough that circulation flow will never overflow the sides of flow channel 20 and in one embodiment has a width of 20 inches. However, the size can be selected as desired with the constraint of avoiding overflow in mind. Flow channel 40 is then calibrated so that fluid flow therethrough is known as a function of fluid level. If the fluid is turbulent, then averaging may be utilized to obtain an average height. An accurate level may be provided for field calibration or other means of calibration may be utilized to calibrate fluid level with fluid flow. In other words, manufacturing facilities may measure fluid flow rates with respect to different angular levels of sensor 12. Then, the level measured in the field determines the calibration to be used in the field. Sensor 12 provides a combination of microwave and sonic sensors to measure the instantaneous mass of a liquid flowing in channel 40 of a pipeline, such as pipeline 30, by indirectly measuring the instantaneous flow rate (cubic centimeters per second) and the instantaneous specific weight (1.0 to 2.2) with special instrumented section or sensor 12. Measurements are taken as often as necessary and integrated over a specific length of time to determine exit mass over that specified time. Sensor 12 is preferably located immediately before or at the point of discharge of the drilling fluid. As stated above, sensor 12 is large enough so that the flow is laminar and that channel 40 is never entirely filled at this point. In one presently preferred embodiment, it is therefore only necessary to accurately measure height 42 of the fluid level through channel 40 to determine the total output fluid flow rate. Fluid height 42 may be measured by determining the distance 44 between fluid surface 46 with respect to sensor 38. The shape of the flow channel within sensor 12 may be rectangular, square, oval, round, or any other shape.

Figure 2:
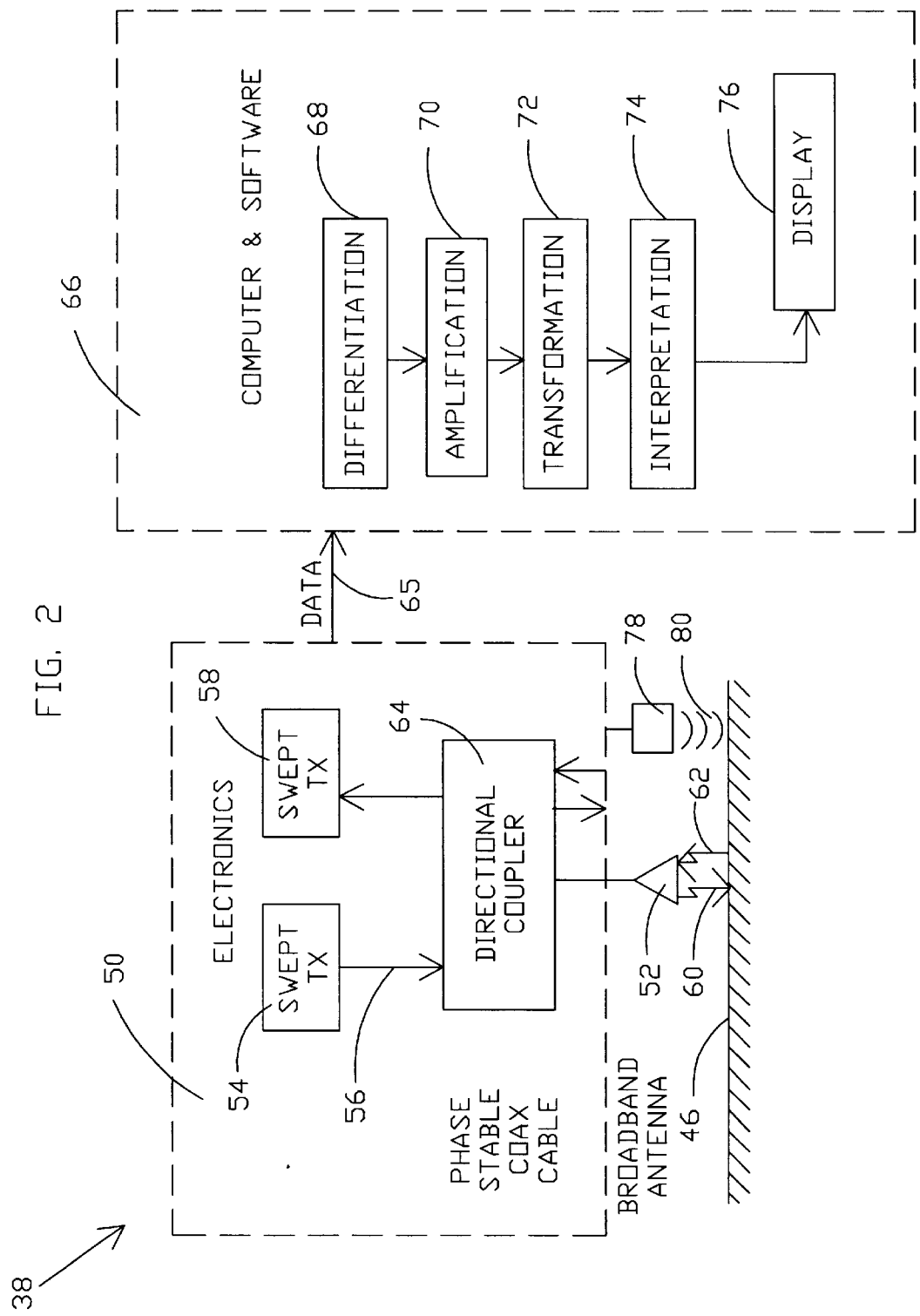
FIG. 2 is a block diagram schematic showing a microwave/acoustic sensor to measure fluid height in accord with the present invention.

Referring now to FIG. 2, height measurements are made by a presently preferred sensor 38 with microwave electronics 50 which includes both transmitter 54 and co-located receiver 58. Microwave electronics 38 are located at the top of the pipeline and radiate directly downward towards the drilling fluid. If desired, a microwave invisible cover (not shown) may be positioned between the fluid and microwave electronics 38 for insulation thereof. Moreover, electronics section 50 may preferably be insulated whereby any gases present are prevented from seeping into the electronics section and/or standard explosion proof electronic package construction techniques may be utilized as desired.

Part of the radiated microwave energy is reflected by the fluid surface 46 and returns to antenna 52. Since the radiated energy is swept in frequency over a large bandwidth, the return energy is also frequency-dependent, both in amplitude and phase. The time delay of the return frequency spectrum as compared to the transmit frequencies is dependent upon distance 44 (see FIG. 1B) traveled from the antenna to the fluid surface. This measurement can then be used to determine height 42 (or depth 44) of the fluid as indicated in FIG. 1B.

The larger the bandwidth of the swept frequencies, the more information is available for accurate distance measurements. Electronics section 50 includes a swept transmitter module 54 which produces a signal composed of stepped sinusoids over a large frequency range. In one embodiment of the present invention, a frequency range from 16 to 26 GHz is utilized. Swept transmitter 54 steps or sweeps through a plurality of frequencies over the selected frequency range. The number of steps or frequencies transmitted may be selected based upon a trade off of accuracy and processing time. As a general rule, more frequencies will improve the resolution but will also slow down the processing. In a presently preferred embodiment, the signal broadcast at each frequency is preferably a continuous signal. To eliminate frequency variations due to electronics system 38, it is desirable to use phase stable equipment throughout such as phase stable coaxial cable 56.

Antenna 52 may comprise a directional horn antenna to minimize undesirable illumination. Electromagnetic wave 60 impinges upon fluid surface 46 and returns to antenna 52 via reflection(s) 62. Reflection 62 will have a magnitude, phase, and a time delay. The height determination is accomplished with a modified Fourier transform technique using the amplitude and phase of the received signal as described subsequently. The magnitude and phase of the reflected energy is frequency dependent. Swept receiver 58 receives a plurality of reflections due to the plurality of different transmitted frequency signals. Acoustic sensor 78 which transmits and detects acoustic signal 80 which is used as discussed below to resolve $2\pi$ phase ambiguities by providing a rough indication of the fluid height. Swept receiver 58 receives data from directional coupler 64 and provides this information to computer and software section 66 via data line 65 which may be a cable, transmitter, and/or other means. Data line 65 may also provide acoustic sensor data from acoustic sensor 78.

When received in computer/software section 66, the information including magnitude, phase, and time delay for each reflection is preferably measured, digitized, and stored along with rough distance information provided by acoustic signal sensor 78. In a preferred embodiment as discussed subsequently the information is then differentiated at 68, amplified at 70, transformed at 72, interpreted at 74 and/or displayed at 76. These steps are provided for general description and may be modified as desired in accord with processing goals as discussed subsequently. The reflected microwave energy is received and processed through microwave receiver 58, with care being taken to ensure phase and amplitude linearity over the frequency band of the return signals.

Figure 3:
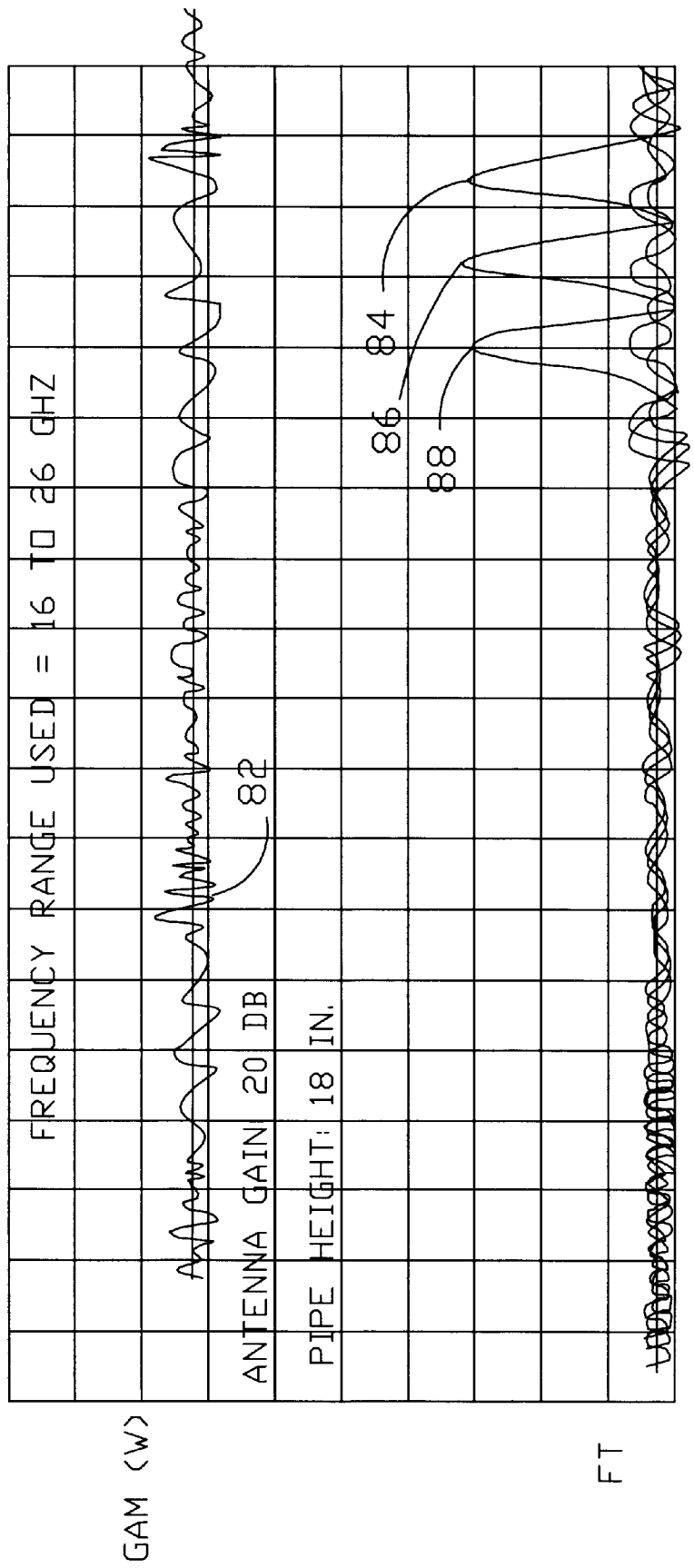
FIG. 3 is a computer display showing overlaid sensor response signals to fluid heights within a fluid channel wherein the fluid heights are zero inches, one inch, and two inches, respectively, in accord with the present invention.

Referring to FIG. 3, the return signal 82 is shown as a function of frequency in the upper portion of FIG. 3. Return signal 82 may be differentiated with respect to an anticipated reference reflection signal and accordingly amplified as indicated by differentiation section 68 and amplification section 70. With respect to transformation section 72, a modified Fourier Transform (FT) algorithm may be utilized which displays the time traveled for the transmit and return signals as a function of time. FIG. 3 shows FT several superimposed waveforms for different fluid levels. A fluid level of 0 inches is designated as waveform 84, a fluid level of 1 inch is designated as waveform 86, and a fluid level of 2 inches is designated as waveform 88 within an 18 inch deep sensor pipe 12. It will be noticed that the depths are readily discernible for one-inch spacings. These waveforms can be further separated for increased accuracy of measurement using the modified FT described in this document. These measurements were performed over a signal frequency range of 16 to 26 GHz. Smaller bandwidths can still be accommodated with reduced distance measurement sensitivities.

Figure 4:
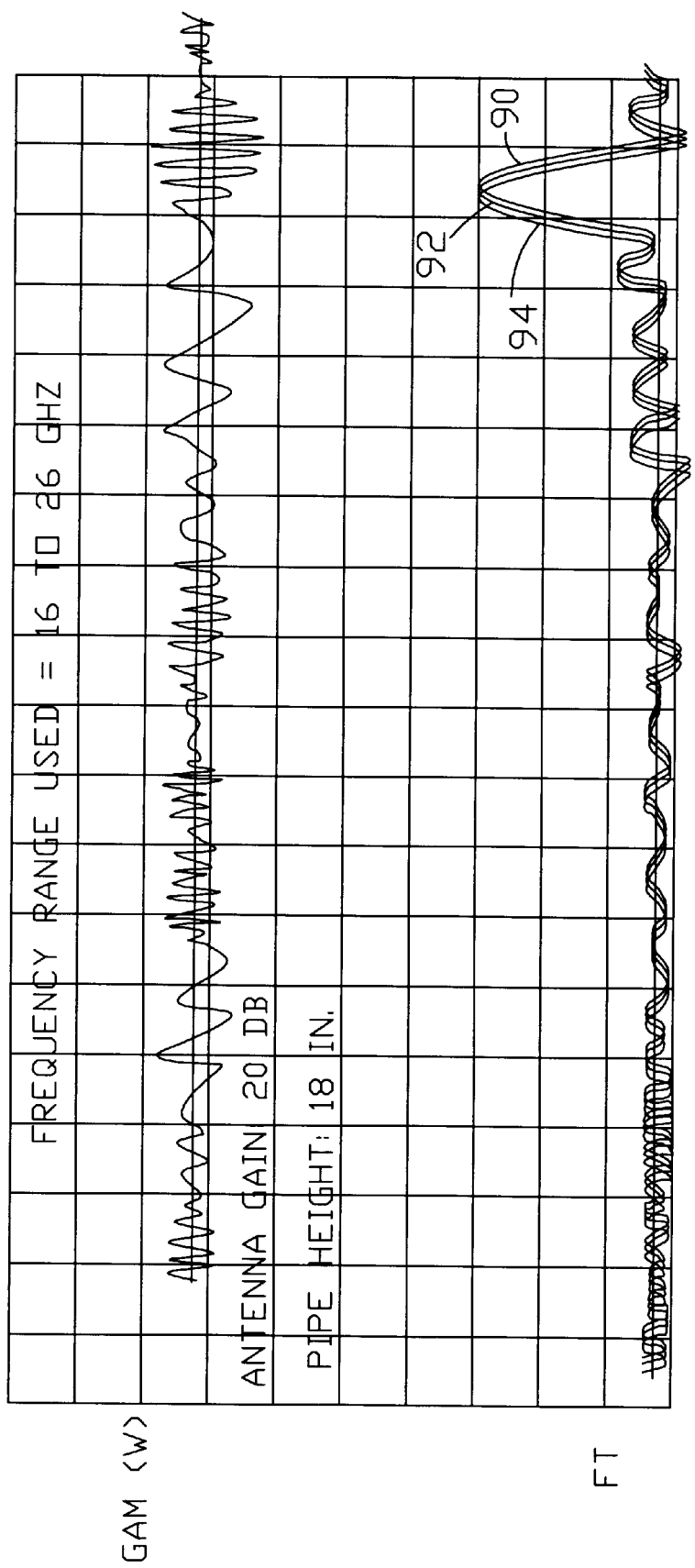
FIG. 4 is a computer display showing overlaid sensor response signals to fluid heights within a fluid channel wherein the fluid heights are zero inches, one-tenth inches, and two-tenth inches, respectively, in accord with the present invention.

Since the wavelengths of microwave signals in the 16 to 26 GHz frequency band vary from 1.88 cm to 1.15 cm, these will have many cycles, or $2\pi$ phase rotations, which will have the same time solutions. The display will not necessarily be able to count the number of cycles or time periods the microwave signal will have traveled from the antenna to the fluid surface and returned. For this purpose, separate sonic transmitter/receiver or transducer 78, also located at the top of the special pipeline section and transmitting directly downward towards the liquid, is preferably used to resolve any $2\pi$ a phase ambiguities in the microwave height measurement. Sonic transducer 78 is preferably used for a rough fluid height indication and the microwave sensor is used for fine (within 0.1 inch) height accuracy as shown in FIG. 4. In this way, the particular $2\pi$ phase range can be determined and defined for the reflected microwave signal, by knowing the approximate time period during which the particular $2\pi$ phase range with the phase change of interest to be measured is received, thereby reducing or eliminating $2\pi$ a phase ambiguities. However, it will be understood that a sonic transducer, such as transducer 78 may be used by itself for determining fluid height or the microwave sensor may be used by itself for determining a fluid height. Although in one preferred embodiment, both sensors are utilized simultaneously.

In FIG. 4, a composite of waveform signals 90, 92, and 94 are provided on one display for different fluid levels. Waveform signal 90 represents zero inches fluid height, 92 represents 0.1 inches fluid height, and 94 represents 0.2 inches fluid height.

The signals from the sonic transducer and the microwave system are preferably combined within a digital signal processor (DSP), which may comprise interpretation section 74, to provide a digital readout of the distance from the antenna to the top of the flowing fluid, thereby providing a measurement of the fluid height within the special section of flow pipe. As discussed above, this implies a previous calibration of liquid height versus volume flow rate for sensor 12.

In a preferred embodiment, the modified FT algorithm used for accurately determining time delay, or fluid height, takes advantage of high speed Fast Fourier Transform (FFT) algorithms normally implemented in DSP platforms. This modified FT assumes the reflective time delay is constant over the transmitted RF frequencies and any distortion mechanisms can be modeled as white Gaussian noise. The return signal signature over the transmit band of frequencies can be expressed as:

$$y_{sig}(\omega) = \sum_{i=1}^{P} a_i e^{-j\omega \tau_i} + y_{ref}(\omega) \quad (1)$$

where P=the number of discrete frequencies used in the transmit signal
$a_i$=$i^{th}$ reflection amplitude
$\tau_i$=$i^{th}$ time delay
$y_{ref}(\omega)$=the signal associated with the reflection due to the length of coaxial cable to the antenna.

The inverse FT of the return signal from the surface of the fluid is a series of impulse functions:

$$h_{sig}(t) \equiv \sum_{i=1}^{P} a_i \delta(t - \tau_i)$$

Since $Y_{sig}(\omega)$ is only defined at discrete values of $\omega$ over a limited bandwidth, the calculated impulse response function $h_{sig}(t)$ will have inherent distortions created by the frequency domain quantization and the bandwidth limiting. The size of the frequency sample will determine the length of signal vector $y_{sig}(\omega)$ and the size of the impulse response function, $h_{sig}(t)$. This implies that the time resolution is intimately linked to the size of the frequency data. If the frequency vector is, $$\omega \rightarrow \omega_m : \{\omega_1, \omega_2, \ldots, \omega_M\}$$

then the time domain vector will be, $$t \rightarrow t_m : \{t_1, t_2, \ldots, t_M\}$$

where the sample time resolution is inversely proportional to $\omega_m$. Hence the need for a wide microwave bandwidth to achieve very accurate distance measurements.

For the fluid density measurements, one or more sets of medium frequency (4 KHz to 35 KHz) sonic transducers (transmitter and receiver), such as transducer group 83 in FIG. 1B are located on the walls of special pipeline section 12. The specific weight measurements are preferably made using one or more single frequency sonic transducers to measure phase shift and, in one embodiment, associated $2\pi$ phase ambiguities with the sonic signal used for density measurement. One arrangement of transducers is also shown in more detail in FIG. 8 that comprises sonic transmitters 84, 90 and sonic receivers 86, 88. One set, or multiple sets of transmitter/receiver sensors, will be needed, depending upon the distance between the transmitter and receiver and also upon the variation in fluid densities. As well, multiple sets may be utilized to measure fluid densities at multiple layers, if desired, and/or to measure fluid velocities at different layers as desired. In many cases, the fluid density is fairly constant or homogenous due to considerable mixing during the circulation flow although various sized clippings may also be included in the flow depending upon the location of the sensors in the fluid circulation system and the type of drilling fluid filtering system utilized.

In a presently preferred embodiment, the phase shift of the sonic wave front in the fluid between the transmitter and receiver is used to determine the density or specific weight of the fluid. The velocity of a sound wave in a liquid is given by the equation $$\text{Vel} = \sqrt{E/d} \quad (2)$$

where E is the bulk modulus of elasticity of the fluid, and d is the density of the fluid.

For many drilling fluids, the bulk modulus typically tends to remain fairly constant over a range of different fluid densities. The velocities of sound in fresh water and salt water are well known. Likewise a set of calibration data of sonic velocity versus mud density over the density range of interest can be obtained. By measuring the phase shift of the sonic signal between the transmitter and receiver, and knowing the distance between the transmitter and receiver, the effective wavelength of the signal is calculated. Since the frequency is unchanged (the sonic transducers are preferably perpendicular to the fluid and, therefore, any Doppler shifts are negligible), the velocity of the sonic wave is calculated.

By comparing the calculated velocity with velocity calibration data, the density of the fluid is now available. The accuracy of the density measurement depends upon the phase shift measurement, which may be less than plus or minus 5 degrees electrically. A 5 degree phase error results in a 0.01388 inaccuracy in wavelength and velocity, and a 2.8% inaccuracy in fluid density. However, it is anticipated that phase errors of 0.3% or better are achievable utilizing methods in accord with the present invention.

In the density measurement, as in the height measurement discussed previously, $2\pi$ phase ambiguities have to be accounted for. This can be accomplished in several ways. In one method in accord with the present invention, two sonic frequencies are utilized. The higher frequency is used for density measurement fine accuracy and lower frequency is used for resolution of phase ambiguities. In another method in accord with the present invention, one frequency is selected that has no ambiguities over the distance between sensors for the expected range of variations in density of the fluid. This latter one-tone configuration has the advantage of being simpler but does not necessarily have the density resolution of the two-tone scheme.

Figure 8:
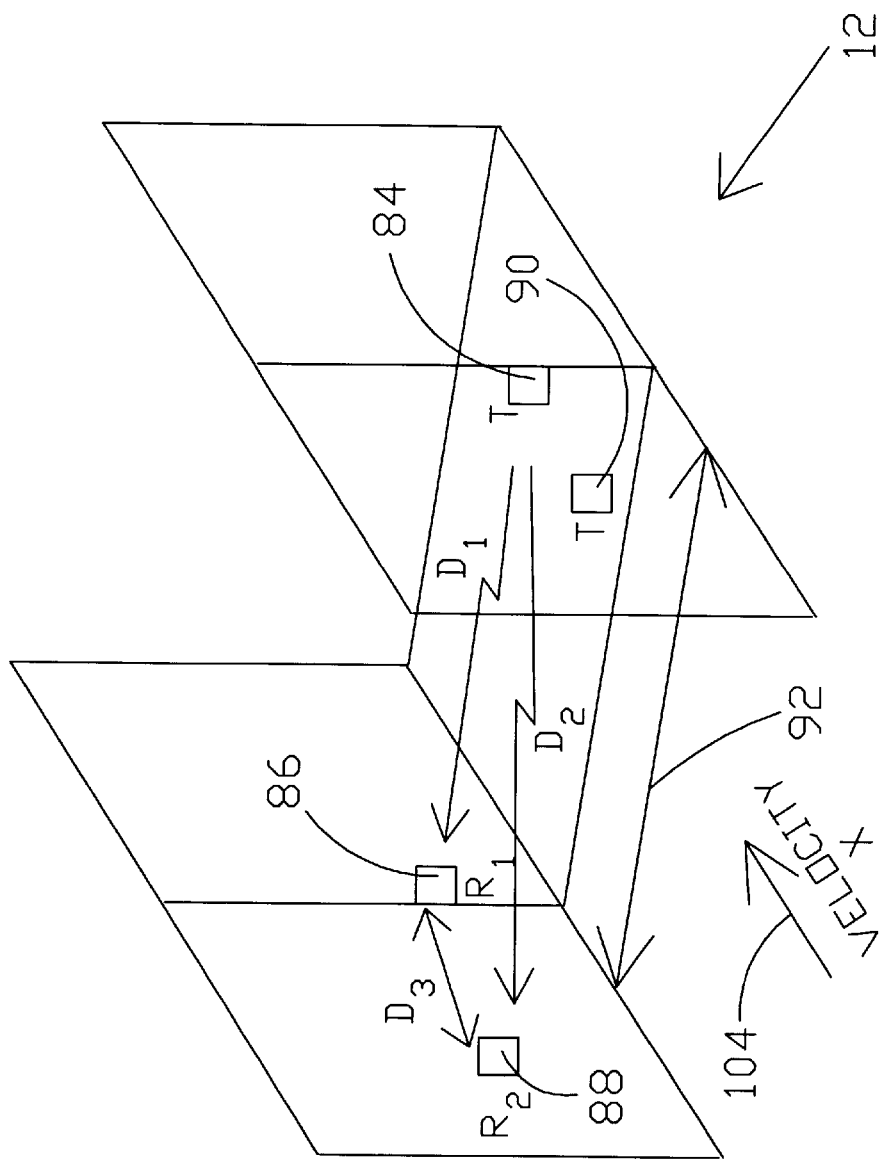
FIG. 8 is a diagrammatic view of a channel with various acoustic channels disposed below the fluid surface for measuring fluid density and/or fluid velocity in accord with the present invention.

In FIG. 8, sensors 84–90, and/or other sensors are preferably positioned so as to be beneath the fluid level of pipeline sensor 12 for fluid density measurements, velocity measurements, and the like. Likewise in FIG. 1B, sensor group 83 is preferably positioned below the fluid level of pipeline sensor 12. Sensors 84–90 should preferably be flush-mounted so as not to restrict or modify the flow and should preferably be of any type sufficiently rugged enough to withstand the battering of the flow. The sensor surfaces should also be sufficiently slippery so as to avoid contamination by drilling mud build-up. A flush-mounted ceramic cap on the sensors should meet these requirements. Moreover, the vibration of the cap should aid in self-cleaning.

Figure 5:
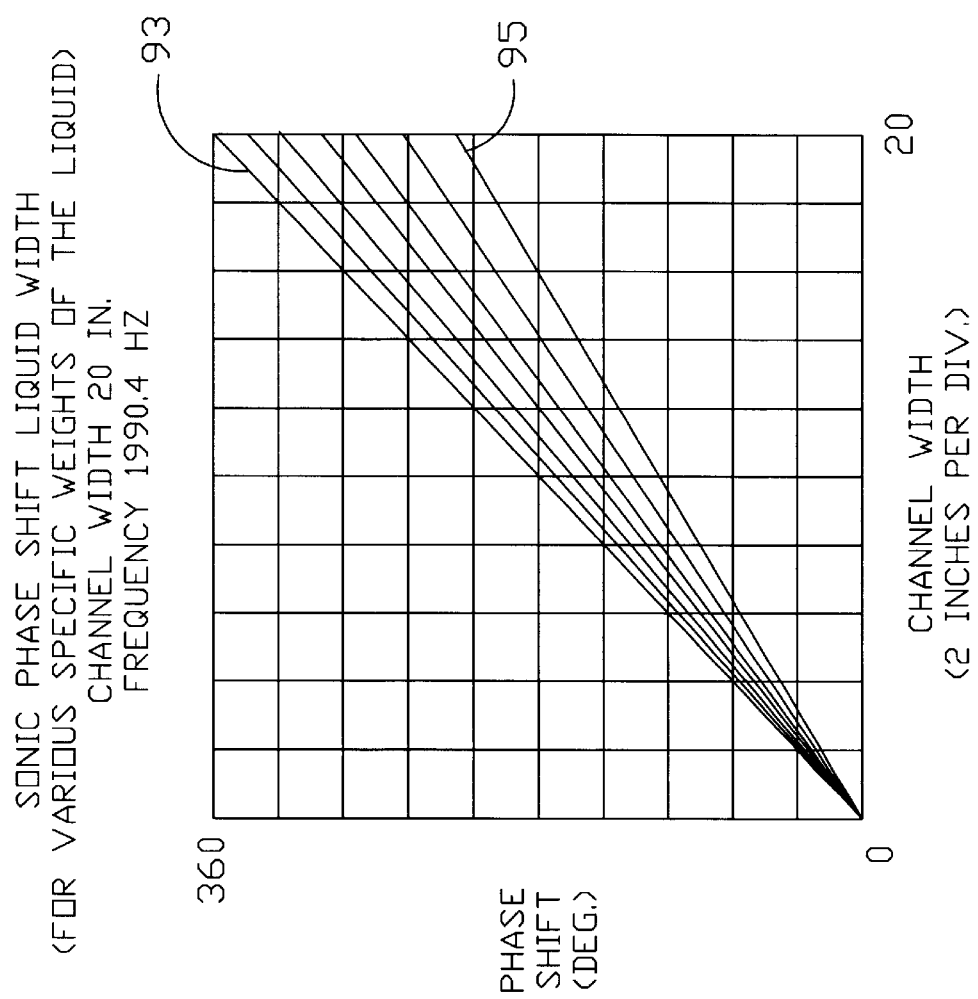
FIG. 5 is a computer display showing sonic phase shift for various specific weights and for various channel widths at a selected signal frequency in accord with the present invention.

Thus, while the density measuring system in accord with the present invention may utilize additional sonic sensors to correct $2\pi$ phase ambiguities, an alternate embodiment provides for adjustment of the sonic frequency with respect to the width 100 of sensor 12 whereby the maximum phase shift over the range of expected fluid densities is 360°, or thereabout, to avoid $2\pi$ phase ambiguities. In the graph of FIG. 5, the fluid channel width is 20 inches and the frequency was chosen to be 1990 Hz such that the total phase shift through the densest mud (specific weight=2.0) is 360°. For purposes of calibration, the phase shift may be set somewhat less than 360° but will typically be adjusted to be as close to possible to 360° and therefore is in a range between 270° and 360° and preferably in a closer range such as between 330° and 360°. By making this adjustment, the $2\pi$ phase ambiguities in the phase shift for the selected range of densities is eliminated. The graph of FIG. 5 shows a linear phase shift with distance with an increasing slope as the mud density increases whereby curve 93 represents phase shift versus distance for drilling fluid with a specific weight of 2.0 and curve 95 represents phase versus distance for drilling fluid with a specific weight of 0.8.

Figures 6, 7:
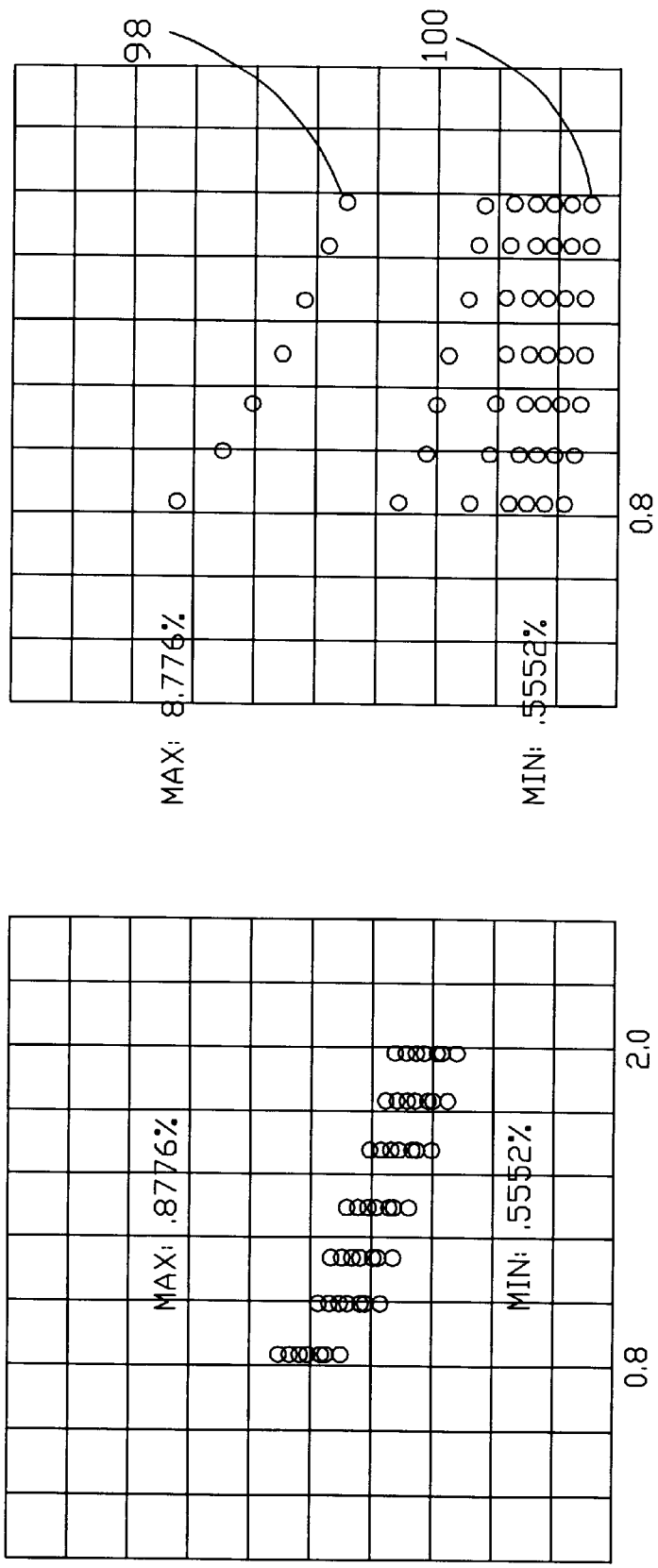
FIG. 6 is a computer display showing density error for one degree of phase shift error for various fluid densities wherein a selected signal frequency is calibrated to channel width in accord with a preferred embodiment of the invention.
FIG. 7 is a computer display showing density error for one degree of phase shift error for various fluid densities wherein the acoustic signal frequency is not calibrated to channel width for comparison with the results of FIG. 6.

FIG. 6 and FIG. 7 indicate density measurement errors due to one degree of phase shift error. However, these projections may be somewhat conservative because phase shift measurement errors are expected to be significantly less than one degree. In FIG. 6 where the frequency is adjusted to the channel width for a 360° phase shift with respect to the channel width for density variations from 0.8 to 2.0, the percentage density measurement error varies from 0.8776% maximum error to 0.555% minimum error. In FIG. 7, where no adjustments were made, and where the variations in error due to variation of channel widths can be more easily seen, the variation of density measurement error ranges from 8.775% to 0.554%. Upper measurement points 98 represent a two-inch channel and lower measurement points 100 represent a twenty-inch channel. The graphs of FIG. 6 and FIG. 7 display density error versus density. Thus, by optimizing the acoustic frequency for the channel width to allow the total phase shift error to be 360° (or slightly less depending on calibration adjustment procedures) over the 0.8 to 2.0, the readings for an anticipated density range provides a rather low density error. The error can be reduced even further, if desired, utilizing another acoustic frequency to avoid $2\pi$ phase ambiguities although the simplicity of the present system, which requires only two acoustic sensors to produce a density reading, may be desirable.

Figure 9:
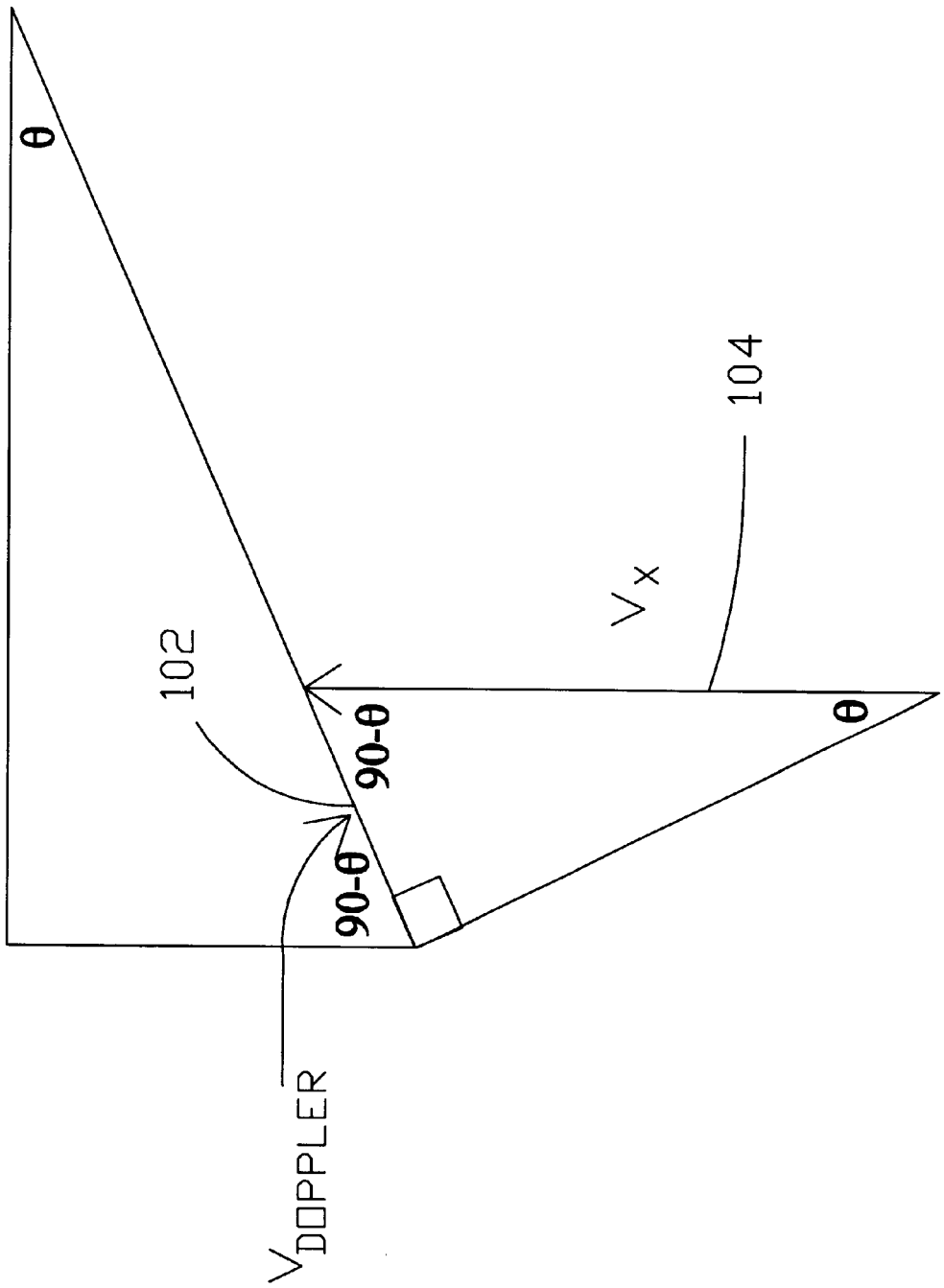
FIG. 9 is a vector schematic showing an alternate method of determining fluid velocity in accord with the present invention.

FIG. 8 and FIG. 9 disclose features of a method for determining fluid velocity in accord with the present invention. It will be understood that while the fluid velocity determined may be limited to the velocity of only a selected section of fluid flow, multiple transmitter and receiver elements may be utilized to accommodate multiple readings of multiple sections at different depths and positions within the fluid stream as desired. In accord with a preferred embodiment of the present invention, the velocity may be determined by measuring phase shifts of acoustic signals transmitted from one or more acoustic transmitters such as 84, 90 to two or more acoustic receivers such as receivers 86, 88.

As discussed above, the density may be determined based on the change in phase from transmitter 84 to receiver 86 for a particular distance such as distance $D_1$ which may preferably be directly across the channel. The velocity based on Doppler component of velocity may then be determined by measuring the phase change between transmitter 90 and receiver 88. The distance $D_2$ and density are known from the previous measurement. Any other difference in phase change will be based on the Doppler component 102 of velocity vector 104 where:

$$Velocity_{Doppler} \propto \sin\theta Vx \text{ where}$$

$$\theta = \tan^{-1}\frac{D_3}{D_1}.$$

Thus, if desired, utilizing the same phase shift measurement that is preferably utilized for determining density, and an additional acoustic sensor, a velocity vector may be determined. If it is desired to determine multiple velocities at different levels or positions, this can be accomplished by suitable placement of the acoustic sensors, as well as suitable signal techniques such as multiplexing. Note that while one embodiment of the invention may be used for determining density and velocity from which instantaneous mass can be calculated, the present techniques may also be utilized for density and velocity measurements in various types of equipment such as portable flow meters and the like which may be used in many operations.

Figure 10:
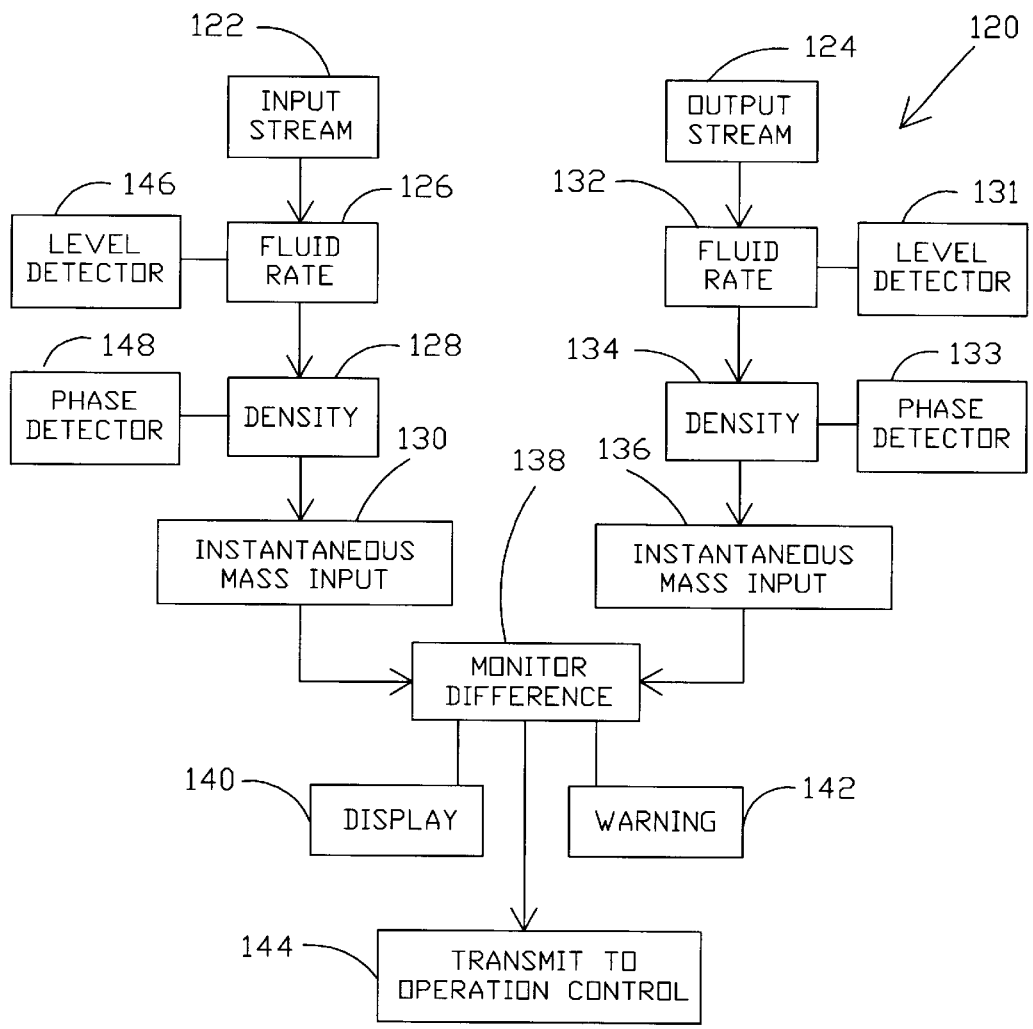
FIG. 10 is a flow diagram of a computerized sensor system for comparing fluid input instantaneous mass with fluid output instantaneous mass.

FIG. 10 discloses a flow diagram for use of the present invention in system 120 to determine mass flow differences between an input fluid circulation stream as indicated at 122 and an output fluid circulation stream as indicated at 124. The input may be selected before or after mud pump 18 and the output may be selected at some point before fluid reaches mud tank 14. However, if a series of mud tanks and filters are utilized, an appropriate position for output fluid circulation stream 124 may also be found therebetween. Input stream sensors may typically vary from output stream sensors because various information may already be known. In accord with the invention, input fluid flow rate 126 and input fluid density 128 are measured. From this information, mass input per unit time and/or instantaneous mass input as indicated at 130 may be determined. In a preferred embodiment, sensor 12 as discussed above provides means for determining output fluid flow rate as indicated at 132, preferably fluid level detector 131. Acoustic phase detector 133 may preferably be utilized to determine output density as indicated at 134. Fluid flow rate 132 and density 134 may be utilized for determining output mass per unit time and/or instantaneous mass output as indicated at 136. Monitor element 138 may be utilized to detect the difference and provide displays as indicated at 140, warnings or alarms as indicated at 142, and may also be utilized to transmit the information to a desired location such as an operations control headquarters located remotely. While one embodiment of the invention for use with drilling fluid circulation may utilize level detector 131 on the output stream, other embodiments may conceivably utilize additional level detectors such as level detector 146 on input stream 122 and/or phase detector 148 or other means for density measurement as discussed hereinbefore.

FIG. 11 discloses an embodiment of fluid measurement system 150 which may be utilized for measuring the quantity of liquid present in a container 162 such as a tank, fuel line, channel, or other container or transport line, that may be located within a zero or near zero gravity environment. System 150 preferably comprises any desired number N of transmitters such as transmitters 152, 154, 156, 158, and 160. The number of transmitters may be suitably varied for the size/shape of container 162 and desired accuracy of measurement. Container 162 may contain liquid such as liquid oxygen or hydrogent or other liquids which may form or clump into masses, lumps, blobs 164, and the like in zero and low gravity environments, or other under conditions such as variable acceleration impulse changes that may toss the fluid around within the container. Gaseous bubbles such as oxygen bubbles may also form within tank 162. Thus, commonly utilized level detectors and/or other detectors that rely on gravity may be of little value in determining the quantity of fluid in tank 162 under zero gravity circumstances and/or other circumstances where the position of the liquid in the container is not controlled or only partially controlled by gravity.

In a presently preferred embodiment, each transmitter may operate and a different frequency. Each transmitter may be associated with a plurality of receivers positioned circumferentially around container 162. Thus, as shown for upper transmitter 160, a set of associated plurality of receivers 166, 168, 170, 172 may be utilized for measuring fluid density or amount of fluid along associated transmitter paths 174, 176, 178, and 180. More or fewer receivers may be utilized as desired. If fluid is flowing through container 162 or portions thereof, then appropriate velocity measurements may also be made as discussed above. For instance, the general cylindrical configuration of container 162 could also comprise a fuel line whereby fluid measurement system 150 could be utilized to measure acceleration/velocity perturbations such as perturbations produced in the fuel line feeding liquid oxygen or hydrogen to a rocket engine. Each transmitter and associated receiver group preferably operates at a different frequency. Thus, receiver 182 operates at the frequency of transmitter 158. Receiver 182 is preferably associated with another plurality of receivers (not shown) as discussed above which may preferably line the circumference of tank 162 and receive acoustic signals from transmitter 158 at a particular frequency. Thus, receivers 184, 186, and 188 receive signals at different frequencies from associated transmitters 156, 154, and 152. Moreover, each receiver 184, 186, and 188 may also be associated with a set or plurality of other receivers positioned around the circumference of tank 162 as discussed above. In this way, the density and/or amount of fluid along a plurality of transmitter paths can be determined. By combining and interpolating the readings from the plurality of transmitter paths, the amount of liquid present in tank 162 may be measured and/or calculated on an instantaneous basis.

FIG. 12 shows measurement system 200 that comprises yet another embodiment of the present invention. In a presently preferred embodiment, measurement system 200 comprises collar 202 with multiple transmitters and receivers supported therein for making measurements in container 220 which may comprise a tank, fuel line, channel, or the like. In one embodiment, container 220 may comprise a solid rocket fuel tube and measurement system 200 may be utilized to measure solid rocket fuel variations or inhomogenuities therein. In one embodiment, collar 202 may be flexible and/or axially moveable along the length of container 220. Transmitters 212, 214, 216, and 218, which represent any number N of transmitters, may each preferably operate at a different frequency as discussed above. In one embodiment, receivers 204, 206, 208, and 210 represent any number N of receivers which operate to receive signals at different frequencies thereby permitting simultaneous operation of all transmitters and receivers. Collar 202 may be slid axially along the cylindrical outer surface of container 220 and the resulting received signals logged with respect to the axial distance along the length of container 220. Variations in signals so measured would indicate inhomogenuities within the rocket fuel. In one embodiment, a reference phase shift may be measured through each propagation path, e.g. path 224 from transmitter 212 to receiver 210. This reference is then subtracted from the real-time measurements as the collar is moved axially along the outer surface of container 220 to thereby detect variations. Collar 202 may be elastic and stretched around container 202 to thereby bias the transmitters/receivers into acoustic contact with the surface of container 220. If movement of collar 202 axially along container 220 produces noise, then readings could be taken at stations whereby collar 202 is stationary when readings are taken. For instance, stations may be positioned each inch or quarter-inch or any at other suitable spacing along the length of container 220. Note that operation could also be multiplexed whereby, for instance, transmitter 218 transmits a first signal at a first frequency that is received at each of receivers 204, 206, 208, and 210. Transmitter 220 could then transmit a second signal that is received by each of receivers 204, 206, 208, and 210, and so forth. In this manner, additional transmitter paths 224 could be utilized, if desired.

Thus, in one embodiment of the invention, a dual sonic system is utilized for measuring densities in combination with a simultaneous use of a sonic system and a microwave system for fluid height (fluid flow rate) measurements. Resolution of $2\pi$ phase ambiguities allows for very accurate measurements to be achieved both for phase shift of density measurements utilizing two different sonic frequencies as well as resolution of microwave measurements utilizing a rough sonic distance transducer. An added feature of this system is that it allows fast real-time measurements of the entire fluid flow and does not need a by-pass channel to sample only a portion of the fluid.

It will be understood that various types of microwave and/or acoustic signals could be utilized to effect the general operation of the invention disclosed above. For instance, acoustic and/or microwave pulses could be utilized. In general, it will be understood that such terms as "up," "down," "vertical," and the like, are made with reference to the drawings and/or the earth and that the devices may not be arranged in such positions at all times depending on variations in operation, transportation, mounting, and the like. As well, the drawings are intended to describe the concepts of the invention so that the presently preferred embodiments of the invention will be plainly disclosed to one of skill in the art but are not intended to be manufacturing level drawings or renditions of final products and may include simplified conceptual views as desired for easier and quicker understanding or explanation of the invention. As well, the relative size/type/arrangement of the components may be greatly different from that shown and still be in accord with the spirit of the invention as described in the accompanying claims, descriptions, and equivalents thereof.

Therefore, the foregoing disclosure and description of the invention are illustrative and explanatory thereof, and various changes in the method steps and also the details of the apparatus may be made within the scope of the appended claims without departing from the spirit of the invention.

What is claimed is:

1. A fluid measurement system for a fluid, said system comprising:
   a detector section defining a fluid channel for receiving said fluid;
   a sonic detector mounted to said detector section with respect to said fluid channel for transmitting an acoustic signal towards a fluid surface of said fluid within said fluid channel and for receiving an acoustic signal reflection from said fluid surface; and
   a microwave detector mounted to said detector section with respect to said fluid channel so as to be operable for transmitting a microwave signal towards said fluid surface and receiving a microwave signal reflection from said fluid surface.

2. The fluid measurement system of claim 1, further comprising an instrument section operable for determining a first approximate fluid level of said fluid surface with respect to said fluid channel from said acoustic signal reflection and for determining a second more accurate fluid level of said fluid surface from said first approximate fluid level and said microwave signal reflection.

3. The fluid measurement system of claim 1, further comprising an instrument section for determining a fluid flow rate of said fluid through said fluid channel from a fluid level of said fluid surface within said fluid channel.

4. The fluid measurement system of claim 3, wherein said instrument section is operable for determining said fluid flow rate solely from said fluid level within said fluid channel.

5. The fluid measurement system of claim 1, further comprising a plurality of acoustic sensors mounted to said detector section in communication with said fluid channel.

6. The fluid measurement system of claim 5, further comprising a transmitter acoustic sensor for producing a transmitted acoustic signal and a receiver acoustic sensor for receiving a received acoustic signal.

7. The fluid measurement system of claim 6, further comprising an instrument section for detecting a phase difference between said transmitted acoustic signal and said received acoustic signal, said instrument section being operable for determining a fluid density of said fluid from said phase difference.

8. A fluid measurement system for a fluid, said system comprising:

a detector section defining a fluid channel for receiving said fluid;

at least one acoustic signal transmitter mounted to said detector section in communication with said fluid channel for transmitting at least one acoustic signal through said fluid and wherein said at least one acoustic signal has at least one acoustic signal transmission frequency;

at least one acoustic signal receiver mounted to said detector section in communication with said fluid channel operable for receiving said at least one acoustic signal transmitted through said fluid from said at least one acoustic signal transmitter, wherein a predetermined spacing between said at least one acoustic signal transmitter and said at least one acoustic signal receiver is defined in said detector section, and wherein said at least one acoustic signal transmission frequency is such that a $2\pi$ phase range of said at least one acoustic signal received by said at least one acoustic signal receiver is predetermined; and at least one instrument section operable for determining a density of said fluid from a phase change of said at least one acoustic signal between said at least one acoustic signal transmitter and at least one acoustic signal receiver.

9. The fluid measurement system of claim 8, further comprising:
   said acoustic signal transmission frequency being such that a maximum phase change for all anticipated densities of said fluid is in the range of from 270° to 360°.

10. The fluid measurement system of claim 8,
    wherein said at least one acoustic signal transmission frequency is adjustable.

11. The fluid measurement system of claim 8, wherein said at least one acoustic signal transmitter comprises a first acoustic signal transmitter mounted to said detector section in communication with said fluid channel for transmitting a first-acoustic signal through said fluid and a second acoustic signal transmitter mounted to said detector section in communication with said fluid channel for transmitting a second acoustic signal through said fluid, said first acoustic signal having a first acoustic signal transmission frequency, said second acoustic signal having a second acoustic signal transmission frequency different from a first acoustic signal transmission frequency, and wherein said at least one instrument section is operable for determining a $2\pi$ phase range of said first and second acoustic signals.

12. A fluid measurement system for a fluid, said system comprising:

a detector section defining a fluid channel for receiving said fluid;

at least one acoustic signal transmitter mounted to said detector section in communication with said fluid channel for transmitting at least one acoustic signal through said fluid;

at least one acoustic signal receiver mounted to said detector section in communication with said fluid channel operable for receiving said at least one acoustic signal transmitted through said fluid from said at least one acoustic signal transmitter;

at least one instrument section operable for determining a density of said fluid from a phase change of said at least one acoustic signal between said at least one acoustic signal transmitter and said at least one acoustic signal receiver; and a microwave transmitter mounted to said detector section.

13. A method of measurement, said method comprising:
transmitting an acoustic signal a predetermined distance through a material of unknown density;
receiving said acoustic signal;
determining a phase difference of said acoustic signal across said predetermined distance;
determining a density of said material from said phase difference; and
determining a 2π range of said phase difference of said acoustic signal.

14. The method of claim 13 wherein said step of determining said 2π range further comprises selecting an acoustic signal transmission frequency based on said predetermined distance such that 2π range is predetermined for an anticipated range of densities of said material.

15. The method of claim 14, further comprising selecting said acoustic signal transmission frequency such that a maximum phase difference of said acoustic signal is less than 360° for an anticipated range of densities of said material.

16. The method of claim 14, further comprising selecting said acoustic signal transmission frequency such that a maximum phase difference of said acoustic signal is in a range of from 270° to 360° for an anticipated range of densities of said material.

17. The method of claim 13, wherein said step of determining said 2π range further comprises transmitting a second acoustic signal at a second frequency, and utilizing said second acoustic signal for determining said 2π range of said phase difference of said acoustic signal.

18. The method of claim 13, further comprising:
transmitting a microwave signal against a surface of said material for determining a level of said material with respect to a container for said material.

19. The method of claim 13 wherein said material is a fluid, said method further comprising:
directing said fluid through a channel comprising predetermined dimensions and orientation; and
utilizing only a fluid level of said fluid in said channel for determining a flow rate of said fluid.

20. The method of claim 19, further comprising:
determining a mass flow rate of said fluid from said density and said flow rate.

21. A method of fluid measurement, said method comprising:
transmitting a microwave signal towards a surface of a fluid to produce a reflected microwave signal;
transmitting an acoustic signal towards said surface of said fluid to produce a reflected acoustic signal; and
utilizing said reflected microwave signal and said reflected acoustic signal for determining a fluid level of said fluid.

22. The method of claim 21, further comprising:
utilizing only said fluid level to determine a flow rate of said fluid.

23. The method of claim 21, further comprising:
determining a density of said fluid; and
utilizing said density and said fluid level to determine a mass flow rate of said fluid.

24. The method of claim 21, further comprising:
determining a 2π range of a phase of said reflected microwave signal utilizing said reflected acoustic signal.

25. The method of claim 21, wherein said step of transmitting said microwave signal further comprises:
transmitting a microwave signal that is stepped over a plurality of frequencies.

26. The method of claim 25, further comprising:
processing said reflected microwave signal by taking a transform to produce a series of impulse functions.

27. The method of claim 26, wherein said series of impulse functions may be represented by the following equation:

$$h_{sig}(t) \equiv \sum_{i=1}^{P} a_i \delta(t - \tau_i) \text{ where}$$

$a_i = i^{th}$ reflection amplitude and
$\tau_i = i^{th}$ time delay.

28. The method of claim 26, further comprising:
utilizing a digital signal processor for said step of taking said transform.

29. A system for measuring fluid mass flow of a drilling fluid circulation stream used while drilling a wellbore with a drilling string, said drilling fluid circulation stream being pumped into said drilling string and returning through an annulus outside of said drilling string, said system comprising:
a sensor housing defining a fluid channel therein, said fluid channel being connected within said drilling fluid circulation stream for receiving a drilling fluid from said annulus;
a first fluid flow rate detector comprising a first microwave detector and a first sonic detector, said first fluid flow rate detector being operable for determining a level of said drilling fluid within said fluid channel, said first fluid flow rate detector utilizing said level for determining a first fluid flow rate through said fluid channel;
a first fluid density monitor within said sensor housing operable for determining a first fluid density of said drilling fluid; and
at least one instrument section being operable for determining a first fluid mass flow of said drilling fluid from said first fluid flow rate and said first fluid density.

30. The system of claim 29, further comprising:
a second fluid density monitor positioned along said drilling fluid circulation stream for determining a second fluid density of said drilling fluid in said drilling fluid circulation stream prior to entry into said drilling string;
a second fluid flow rate detector comprising a second microwave detector and a second sonic detector, positioned along said drilling fluid circulation stream for determining a second fluid flow rate of said drilling fluid in said drilling fluid circulation stream prior to entry into said drilling string; and
said at least one instrument section being operable for determining a second fluid mass flow from said second fluid density and said second fluid flow rate, said at least one instrument section being operable for comparing said first fluid mass flow to said second fluid mass flow.

31. The system of claim 29, wherein said first fluid density monitor further comprises:
an acoustic transmitter for transmitting an acoustic signal a predetermined distance; and
an acoustic phase detector for determining a phase change of said acoustic signal through said predetermined distance.

32. The system of claim 31, wherein said acoustic transmitter has a transmission frequency selected such that a $2\pi$ range of said phase change of said acoustic signal is predetermined.

33. The system of claim 31, further comprising a second acoustic transmitter having a second transmission frequency different from a first transmission frequency of said acoustic transmitter.

34. A method for monitoring a drilling fluid circulation stream for use in drilling a wellbore with a drilling string, said drilling fluid circulation stream being pumped into said drilling string and returning through said wellbore in an annulus outside said drilling string, said method comprising:

measuring a phase change of a first acoustic signal transmitted through said drilling fluid circulation stream in a channel which contains a drilling fluid flowing from said annulus; and measuring a fluid flow rate of said drilling fluid through said channel.

35. The method of claim 34, further comprising:

utilizing said phase change and said fluid flow rate for determining a mass flow output of said drilling fluid flowing from said annulus.

36. The method of claim 35, further comprising:

determining a mass flow input of said drilling fluid flowing into said drilling string; and comparing said mass flow output with said mass flow input.

37. The method of claim 34, wherein said step of measuring said fluid flow rate through said channel further comprises:

transmitting a microwave signal into said channel for reflection by said drilling fluid; and transmitting a second acoustic signal into said channel for reflection by said drilling fluid.

38. The method of claim 37, further comprising:

utilizing said second acoustic signal for reducing $2\pi$ phase measurement errors of said microwave signal.

39. The method of claim 38, further comprising:

determining a level of said drilling fluid in said channel.

40. The method of claim 34, further comprising:

transmitting said first acoustic signal at a frequency selected to reduce $2\pi$ phase measurement errors of said first acoustic signal.

41. The method of claim 34, further comprising:

transmitting a second acoustic signal through said drilling fluid; and utilizing said second acoustic signal to reduce $2\pi$ phase measurement errors of said first acoustic signal.

42. A method for determining a velocity of a fluid, said method comprising:

receiving a first acoustic signal transmitted through said fluid along a first predetermined path;

measuring a first phase change of said first acoustic signal due to a length of said first predetermined path;

determining a density of said fluid;

receiving a second acoustic signal transmitted through said fluid along a second predetermined path;

measuring a second phase change of said second acoustic signal due to a length of said second predetermined path; and calculating said velocity of said fluid utilizing said first phase change, said density, and said second phase change.

43. The method of claim 42, further comprising:

a third predetermined path between respective endpoints of said first predetermined path and said second predetermined path; and determining a doppler velocity component of said velocity.

44. The method of claim 43, further comprising:

determining said doppler velocity using the mathematical relationship $$Velocity_{Doppler} \propto \sin\theta Vx \text{ where}$$

$$\theta = \tan^{-1}\frac{D_3}{D_1} \text{ and}$$

$D_3$ is equal to said third predetermined distance and $D_1$ is equal to said first predetermined distance.

45. A method for fluid flow measurements of a drilling fluid circulation stream used while drilling a wellbore with a drilling string, said drilling circulation stream being pumped into said drilling string and returning through an annulus outside of said drilling string, said method comprising:

directing said drilling fluid circulation stream through a channel;

utilizing an acoustic sensor and a microwave sensor for determining a height of a drilling fluid within said channel;

determining a drilling fluid flow rate utilizing said height of said drilling fluid within said channel;

calibrating said drilling fluid flow rate through said channel based on said height of said drilling fluid within said channel; and determining a mass flow rate of said drilling fluid within said channel.

46. A method for fluid flow measurements of a drilling fluid circulation stream used while drilling a wellbore with a drilling string, said drilling circulation stream being pumped into said drilling string and returning through an annulus outside of said drilling string, said method comprising:

directing said drilling fluid circulation stream through a channel:

utilizing a microwave sensor for determining a height of a drilling fluid within said channel;

determining a drilling fluid flow rate utilizing said height of said drilling fluid within said channel;

calibrating said drilling fluid flow rate through said channel based on said height of said drilling fluid within said channel;

determining a density of said drilling fluid; and determining a mass flow rate of said drilling fluid within said channel.

47. The method of claim 46, further comprising:

measuring a phase angle of an acoustic signal.

* * * * *